(12) United States Patent
Lee et al.

(10) Patent No.: US 10,218,481 B2
(45) Date of Patent: Feb. 26, 2019

(54) APPARATUS AND METHOD FOR TRANSMITTING A REFERENCE SIGNAL IN A WIRELESS COMMUNICATION SYSTEM

(71) Applicant: LG ELECTRONICS INC., Seoul (KR)

(72) Inventors: Moon Il Lee, Anyang-si (KR); Ja Ho Koo, Anyang-si (KR); Jae Hoon Chung, Anyang-si (KR); Bin Chul Ihm, Anyang-si (KR); Hyun Soo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 14/752,498

(22) Filed: Jun. 26, 2015

(65) Prior Publication Data

US 2015/0304076 A1 Oct. 22, 2015

Related U.S. Application Data

(63) Continuation-in-part of application No. 13/265,794, filed as application No. PCT/KR2010/002513 on Apr. 22, 2010, now Pat. No. 9,106,395.
(Continued)

(30) Foreign Application Priority Data

Apr. 21, 2010 (KR) .................. 10-2010-0036969

(51) Int. Cl.
*H04W 24/10* (2009.01)
*H04L 5/00* (2006.01)
*H04W 72/08* (2009.01)

(52) U.S. Cl.
CPC ............ *H04L 5/005* (2013.01); *H04L 5/0023* (2013.01); *H04L 5/0053* (2013.01); *H04W 24/10* (2013.01); *H04L 5/001* (2013.01); *H04W 72/085* (2013.01)

(58) Field of Classification Search
CPC ..... H04L 1/0079; H04L 5/001; H04L 5/0023; H04L 5/005; H04L 5/0051; H04L 25/0204; H04B 7/0465; H04B 7/066; H04B 7/0417
See application file for complete search history.

(56) References Cited

U.S. PATENT DOCUMENTS

2007/0263667 A1* 11/2007 Dubuc ................. H04L 5/0048
370/500
2008/0260062 A1 10/2008 Imamura
(Continued)

FOREIGN PATENT DOCUMENTS

CN 101283533 10/2008
CN 101296030 10/2008
(Continued)

OTHER PUBLICATIONS

3GPP TSG RAN WG1 Meeting #56bis (Seoul, Korea, Mar. 23-27, 2009; Source: NTT DOCOMO; Title: DL RS Design for LTE-Advanced; Agenda Item: 15.1; R1-091483).*
(Continued)

*Primary Examiner* — Jutai Kao
(74) *Attorney, Agent, or Firm* — Lee, Hong, Degerman, Kang & Waimey PC

(57) ABSTRACT

A method of transmitting a reference signal by a base station in a wireless communication system is provided. The method includes: generating a plurality of reference signals for channel measurement, wherein the plurality of reference signals for channel measurement are different types; and transmitting the plurality of reference signals for channel measurement
(Continued)

measurement, wherein the plurality of reference signals for channel measurement are transmitted using one or more subframes as a duty cycle.

12 Claims, 22 Drawing Sheets

Related U.S. Application Data

(60) Provisional application No. 61/171,795, filed on Apr. 22, 2009.

(56) References Cited

U.S. PATENT DOCUMENTS

| | | | |
|---|---|---|---|
| 2009/0270030 A1* | 10/2009 | Jia | H04B 1/1615 455/39 |
| 2010/0023887 A1 | 1/2010 | Rambosek et al. | |
| 2010/0202311 A1* | 8/2010 | Lunttila | H04L 1/0027 370/252 |
| 2010/0238824 A1* | 9/2010 | Farajidana | H04B 7/0417 370/252 |
| 2010/0246376 A1* | 9/2010 | Nam | H04L 5/0051 370/208 |
| 2012/0155423 A1* | 6/2012 | Kishiyama | H04B 7/0678 370/330 |
| 2013/0003788 A1* | 1/2013 | Marinier | H04B 7/024 375/219 |
| 2013/0021926 A1* | 1/2013 | Geirhofer | H04L 5/0048 370/252 |
| 2013/0208604 A1* | 8/2013 | Lee | H04L 25/0226 370/252 |
| 2014/0044109 A1* | 2/2014 | Nogami | H04W 24/10 370/336 |

FOREIGN PATENT DOCUMENTS

| | | | |
|---|---|---|---|
| CN | 101378278 | 3/2009 | |
| CN | 101394251 | 3/2009 | |
| JP | WO 2010150802 A1 * | 12/2010 | ........... H04B 7/0678 |
| KR | 10-0355327 | 10/2002 | |

OTHER PUBLICATIONS

The State Intellectual Property Office of the People's Republic of China Application Serial No. 201080018042.8, Office Action dated Oct. 9, 2013, 6 pages.
Ericsson, "Further Considerations on RS Design for LTE-Advanced", 3GPP TSG-RAN WG1 #56bis, R1-091594, Mar. 28, 2009, 4 pages.
Nokia et al., "CSI-RS design for LTE-Advanced downlink", 3GPP TSG RAN WG1 Meeting #56-bis, R1-091351, Mar. 18, 2009, 8 pages.
CATT, "Considerations on CQI-RS design for LTE-Advanced", 3GPP TSG RAN WG1 meeting #56bis, R1-091518, Mar. 18, 2009, 6 pages.
European Patent Office Application No. 10767301.4, Search Report dated Jul. 26, 2016, 8 pages.
Ye Li, "Pilot-Symbol-Aided Channel Estimation for OFDM in Wireless Systems," IEEE Transactions on Vehicular Technology, vol. 49, No. 4, pp. 1207-1215, Jul. 2000.
Texas Instruments, "Downlink Reference Signal Multiplexing for 8Tx Transmission," R1-090592, 3GPP TSG RAN WG1 56, Feb. 2009, 11 pages.
Samsung, "DL RS Designs for Higher Order MIMO," R1-090619, 3GPP TSG RAN WG1 #56, Feb. 2009, 7 pages.
Fujitsu, "DL Reference Signal Design for 8+8 MIMO in LTE-Advanced," R1-090706, 3GPP TSG-RAN1 #56, Feb. 2009, 12 pages.
Japan Patent Office Application Serial No. 2012-507153, Office Action dated Dec. 14, 2012, 4 pages.
NTT DOCOMO, "DL RS Design for LTE-Advanced," 3GPP TSG RAN WG1 Meeting #56bis, R1-091483, Mar. 2009, 6 pages.
Japan Patent Office Application Serial No. 2012-507153, Office Action dated Sep. 13, 2013, 4 pages.

* cited by examiner

APPARATUS AND METHOD FOR TRANSMITTING A REFERENCE SIGNAL IN A WIRELESS COMMUNICATION SYSTEM

CROSS REFERENCE TO RELATED APPLICATIONS

This application is a continuation-in-part of U.S. patent application Ser. No. 13/265,794, filed on Oct. 21, 2011, now U.S. Pat. No. 9,106,395, which is the National Stage filing under 35 U.S.C. 371 of International Application No. PCT/KR2010/002513, filed on Apr. 22, 2010, which claims the benefit of earlier filing date and right of priority to Korean Patent Application No. 10-2010-0036969, filed on Apr. 21, 2010, and also claims the benefit of U.S. Provisional Application No. 61/171,795, filed on Apr. 22, 2009, the contents of which are all hereby incorporated by reference herein in their entirety.

TECHNICAL FIELD

The present invention relates to wireless communications, and more particularly, to an apparatus and method for transmitting a reference signal in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment (UE), etc. Therefore, various techniques have been developed to overcome the abnormal characteristic of the wireless channel and to increase reliability of wireless communication.

A multiple input multiple output (MIMO) scheme is used as a technique for supporting a reliable high-speed data service. The MIMO scheme uses multiple transmit (Tx) antennas and multiple receive (Rx) antennas to improve data transmission/reception efficiency. Examples of the MIMO scheme include spatial multiplexing, transmit diversity, beamforming, etc.

A MIMO channel matrix is formed by multiple Rx antennas and multiple Tx antennas. A rank can be obtained from the MIMO channel matrix. The rank is the number of spatial layers. The rank may also be defined as the number of spatial streams that can be simultaneously transmitted by a transmitter. The rank is also referred to as a spatial multiplexing rate. If the number of Tx antennas is Nt and the number of Rx antennas is Nr, a rank R satisfies $R \leq \min\{Nt, Nr\}$.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot.

The receiver may estimate a channel between the transmitter and the receiver by using the RS, and may demodulate information by using the estimated channel. For example, when a UE receives an RS transmitted by a base station, the user equipment may measure a channel by using the RS, and may feed back channel state information to the base station. A signal transmitted from the transmitter experiences a channel corresponding to each Tx antenna or each spatial layer, and thus the RS may be transmitted for each Tx antenna or each spatial layer.

Meanwhile, there is an ongoing standardization effort for an international mobile telecommunication-advanced (IMT-A) system in the international telecommunication union (ITU) as a next generation (i.e., post $3^{rd}$ generation) mobile communication system. The IMT-A system aims at the support of an Internal protocol (IP)-based multimedia seamless service by using a high-speed data transfer rate of 1 gigabits per second (Gbps) in a downlink and 500 megabits per second (Mbps) in an uplink. A $3^{rd}$ generation partnership project (3GPP) is considering a 3GPP long term evolution-advanced (LTE-A) system as a candidate technique for the IMT-A system.

An LTE system supports up to 4 Tx antennas in downlink transmission, whereas the LTE-A system supports up to 8 Tx antennas in downlink transmission. However, a UE to which the LTE system is applied (hereinafter, an LTE UE) and a UE to which the LTE-A system is applied (hereinafter, an LTE-A UE) can coexist in a cell. Therefore, the LTE-A system needs to be designed to support both the LTE UE and the LTE-A UE. In addition, various transmission schemes may exist for downlink transmission. Examples of the transmission scheme include a single-antenna scheme, a MIMO scheme, etc. Examples of the MIMO scheme include a transmit diversity scheme, a closed-loop spatial multiplexing scheme, an open-loop spatial multiplexing scheme, and a MU-MIMO scheme.

As such, when the maximum number of supported Tx antennas differs and when UEs to which various transmission schemes are applied coexist in a system, there is a need to provide a transmission apparatus and method capable of transmitting a reference signal optimized as much as possible for each UE.

SUMMARY OF INVENTION

Technical Problem

The present invention provides an apparatus and method for transmitting a reference signal in a wireless communication system.

Technical Solution

According to an aspect of the present invention, a method of transmitting a reference signal by a base station in a wireless communication system is provided. The method includes: generating a plurality of different types of reference signals for channel measurement; and transmitting the plurality of reference signals for channel measurement, wherein the plurality of reference signals for channel measurement are transmitted using one or more subframes as a duty cycle.

In the aforementioned aspect of the present invention, if the plurality of reference signals for channel measurement include a first reference signal for channel measurement and a second reference signal for channel measurement, the first reference signal for channel measurement and the second reference signal for channel measurement may be determined according to a multi-antenna transmission scheme.

In addition, if the plurality of reference signals for channel measurement include a first reference signal for channel measurement and a second reference signal for channel measurement, the first reference signal for channel measurement and the second reference signal for channel measurement may be determined according to a type of a user equipment.

In addition, the user equipment may receive and use any one of the first reference signal for channel measurement and the second reference signal for channel measurement according to a time.

According to another aspect of the present invention, an apparatus for transmitting a reference signal is provided. The apparatus includes: N antennas; and a processor coupled to the N antennas and configured for: generating a plurality of different types of reference signals for channel measurement; and transmitting the plurality of reference signals for channel measurement, wherein the plurality of reference signals for channel measurement are transmitted using one or more subframes as a duty cycle.

Advantageous Effects

A plurality of types of reference signals can be transmitted in a wireless communication system. Among the plurality of types of reference signals, a user equipment can receive a suitable reference signal according to a transmission scheme, a feedback mode, etc. Therefore, overall system performance can be improved.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

For clarity, the following description will focus on LTE (Release 8)/LTE-A(Release 10). However, technical features of the present invention are not limited thereto.

Figure 1:
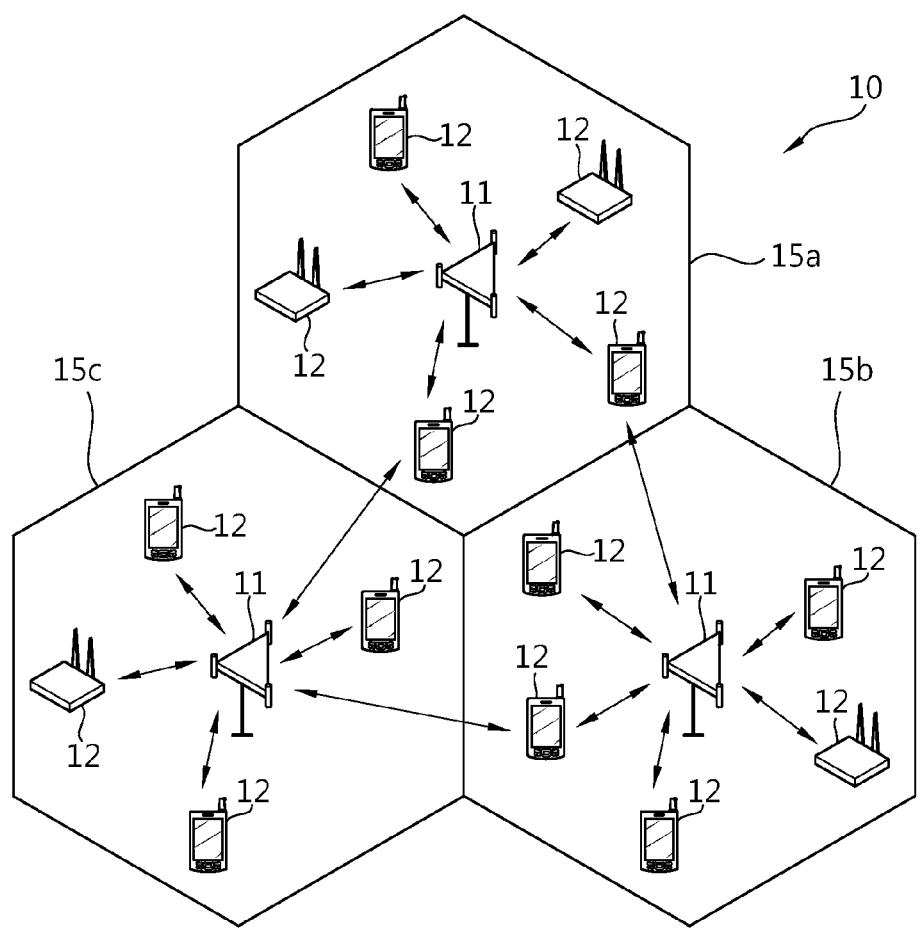
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), an advanced MS (AMS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), an advanced BS (ABS), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

The wireless communication system can support multiple antennas. The transmitter may use a plurality of transmit (Tx) antennas, and the receiver may use a plurality of receive (Rx) antennas. The Tx antenna denotes a physical or logical antenna used for transmission of one signal or stream. The Rx antenna denotes a physical or logical antenna used for reception of one signal or stream. When the transmitter and the receiver use a plurality of antennas, the wireless communication system may be referred to as a multiple input multiple output (MIMO) system.

A wireless communication process is preferably implemented with a plurality of independent hierarchical layers rather than one single-layer. A structure of a plurality of hierarchical layers is referred to as a protocol stack. The protocol stack may refer to an open system interconnection (OSI) model which is a widely known protocol for communication systems.

Figure 2:
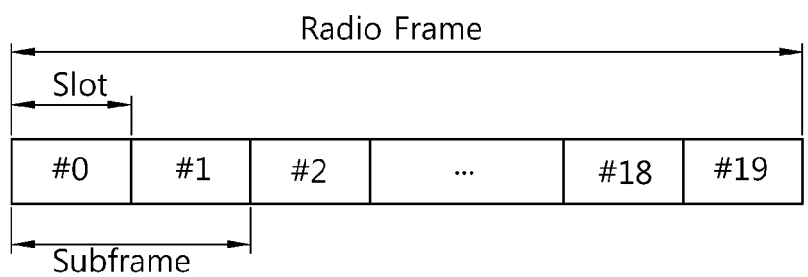
FIG. 2 shows a structure of a radio frame.

FIG. 2 shows a structure of a radio frame.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms. The radio frame of FIG. 2 is shown for exemplary purposes only. Thus, the number of subframes included in the radio frame or the number of slots included in the subframe may change variously.

Figure 3:
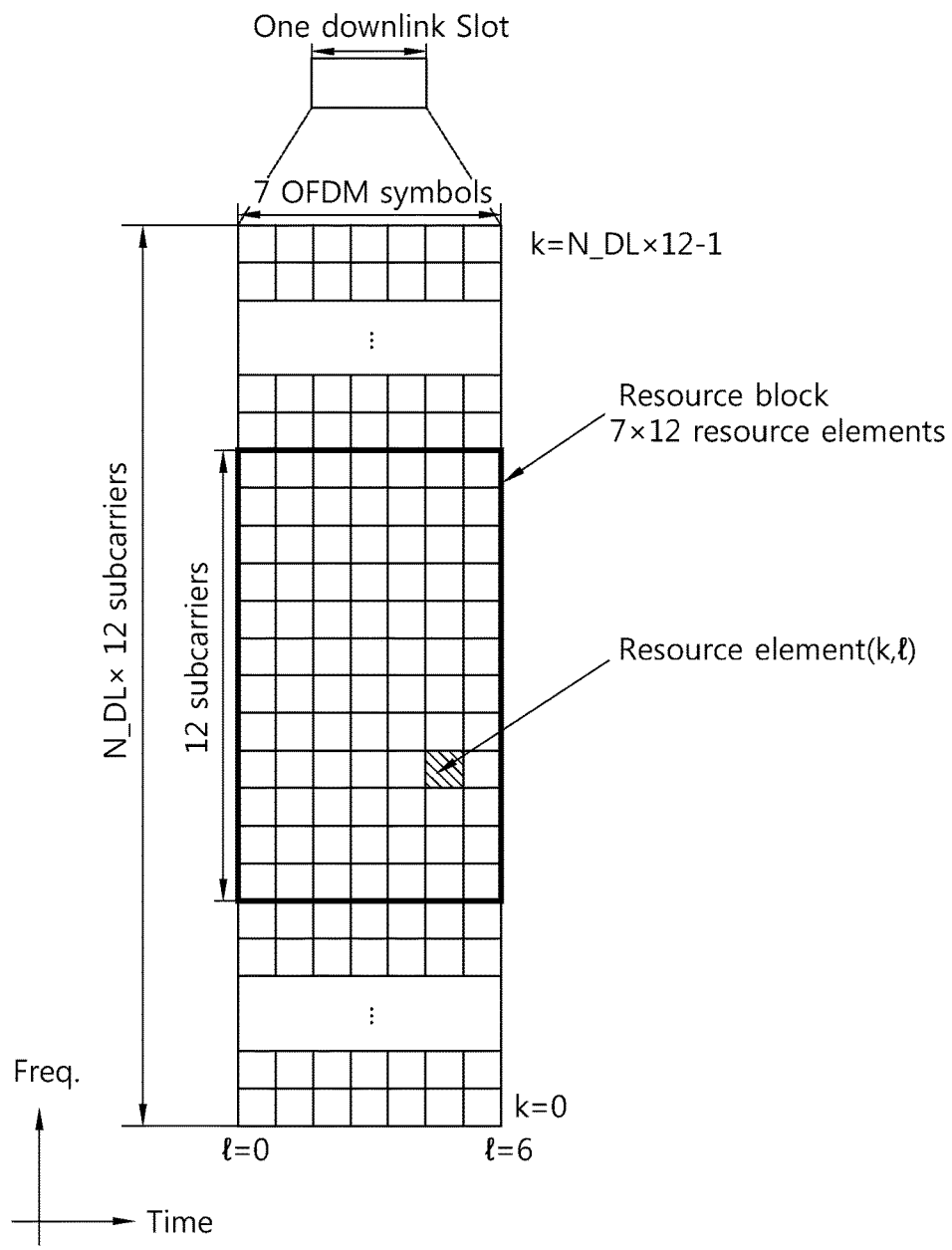
FIG. 3 shows an example of a resource grid for one downlink slot.

FIG. 3 shows an example of a resource grid for one DL slot.

Referring to FIG. 3, the DL slot includes a plurality of orthogonal frequency division multiplexing (OFDM) symbols in a time domain, and includes N_DL resource blocks in a frequency domain. The OFDM symbol is for expressing one symbol period, and may also be referred to as another terminology, such as an OFDMA symbol, an SC-FDMA symbol, etc., according to a multiple access scheme. The number N_DL of resource blocks included in the DL slot depends on a DL transmission bandwidth determined in a cell. In LTE, N_DL may be any one value in the range of 60 to 110. One resource block includes a plurality of subcarriers in the frequency domain.

Each element on the resource grid is referred to as a resource element. The resource element on the resource grid can be identified by an index pair (k, l) within the slot. Herein, k (k=0, . . . , N_DL×12−1) denotes a subcarrier index in the frequency domain, and l (l=0, . . . , 6) denotes a symbol index in the time domain.

Although it is described herein that one resource block includes 7×12 resource elements consisting of 7 OFDM symbols in the time domain and 12 subcarriers in the frequency domain for example, the number of OFDM symbols and the number of subcarriers included in the resource block are not limited thereto. The number of OFDM symbols may variously change depending on a cyclic prefix (CP) length and a subcarrier spacing. For example, in case of a normal CP, the number of OFDM symbols is 7, and in case of an extended CP, the number of OFDM symbols is 6.

The resource grid for one DL slot of FIG. 3 can also apply to a resource grid for a UL slot.

Figure 4:
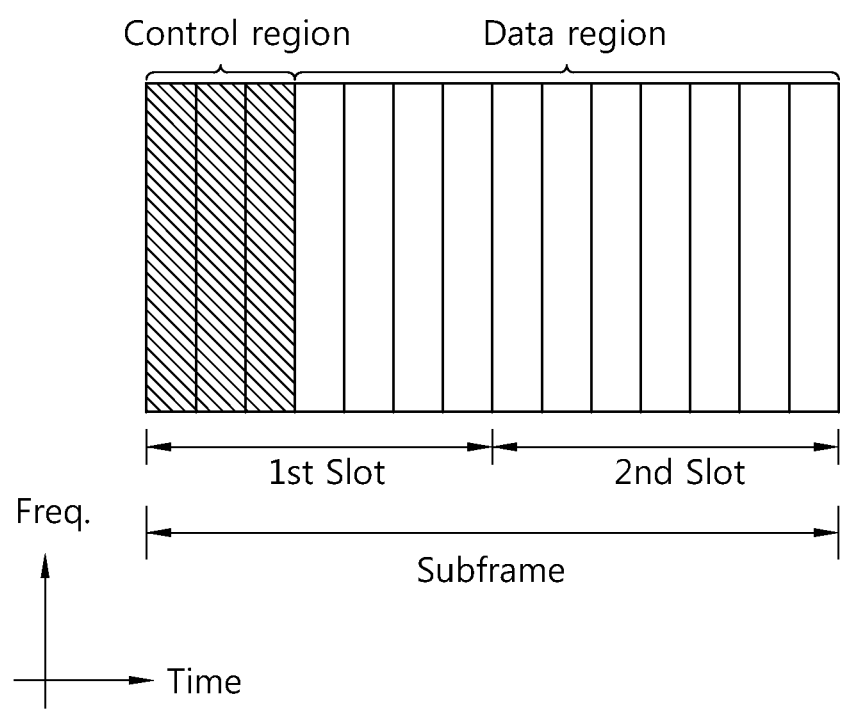
FIG. 4 shows an exemplary structure of a downlink subframe.

FIG. 4 shows an exemplary structure of a DL subframe.

Referring to FIG. 4, the DL subframe includes two consecutive slots. First 3 OFDM symbols of a $1^{st}$ slot included in the DL subframe correspond to a control region, and the remaining OFDM symbols correspond to a data region. Herein, the control region includes 3 OFDM symbols for exemplary purposes only.

A physical downlink shared channel (PDSCH) may be allocated to the data region. DL data is transmitted through the PDSCH.

A control channel may be allocated to the control region. Examples of the control channel include a physical control format indicator channel (PCFICH), a physical hybrid automatic repeat request (HARQ) indicator channel (PHICH), a physical downlink control channel (PDCCH), etc.

The PCFICH carries information indicating the number of OFDM symbols used for transmission of PDCCHs in a subframe to a UE. The number of OFDM symbols used for PDCCH transmission may change in every subframe. The PHICH carries HARQ acknowledgement (ACK)/negative acknowledgement (NACK) for UL data.

The PDCCH carries DL control information. Examples of the DL control information include DL scheduling information, UL scheduling information, or a UL power control command, etc. The DL scheduling information is also referred to as a DL grant. The UL scheduling information is also referred to as a UL grant.

The DL grant may include a resource allocation field indicating a time-frequency resource for transmitting DL data, a modulation and coding scheme (MCS) field indicating an MCS level of the DL data, etc.

A wireless communication system requires a signal known to both a transmitter and a receiver to perform channel measurement, information demodulation, or the like. The signal known to both the transmitter and the receiver is referred to as a reference signal (RS). The RS may also be referred to as a pilot. The RS does not carry information derived from a higher layer, and may be generated in a physical layer.

When the RS is transmitted, the RS may be multiplied by a pre-determined RS sequence. The RS sequence may be a binary sequence or a complex sequence. For example, the RS sequence may use a pseudo-random (PN) sequence, an m-sequence, etc. However, this is for exemplary purposes only, and thus there is no particular restriction on the RS sequence. When the BS transmits the RS by multiplying the RS by the RS sequence, the UE can reduce interference acting on the RS by a signal of a neighbor cell. Accordingly, channel estimation performance can be improved.

The RS can be classified into a common RS and a dedicated RS.

The common RS is an RS transmitted to all UEs in a cell. All UEs in the cell may receive the common RS. To avoid inter-cell interference, the common RS may be determined in a cell-specific manner. In this case, the common RS is referred to as a cell-specific RS. The common RS may be used in channel estimation and information demodulation. An example of an RS used only for channel measurement includes a channel state information-RS (CSI-RS).

The dedicated RS is an RS received by a specific UE group or a specific UE in a cell. The dedicated RS cannot be used by other UEs except for the specific UE or the specific UE group in the cell. The dedicated RS is also referred to as a UE-specific RS. The dedicated RS may be transmitted using a resource block allocated for DL data transmission of the specific UE. The dedicated RS may be used in information demodulation. An RS used for information demodulation is also referred to as a demodulation RS (DRS).

Figure 5:
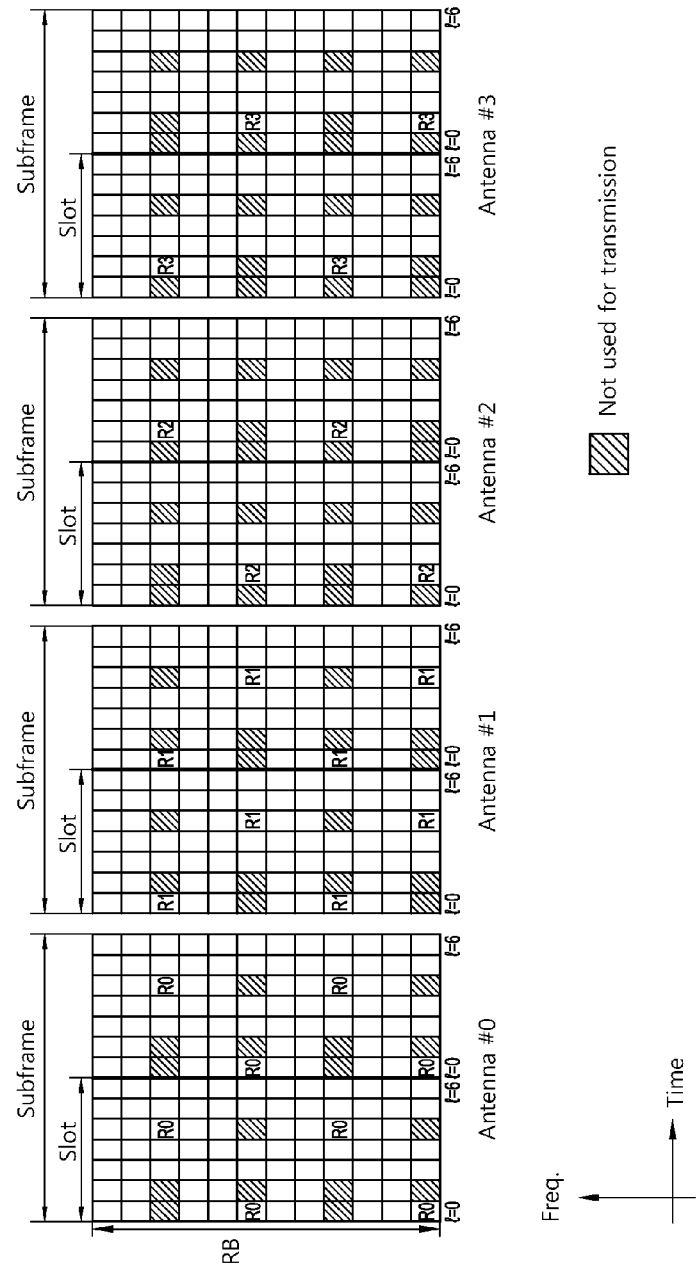
FIG. 5 shows exemplary mapping of common reference signals (RSs) for four antennas when using a normal cyclic prefix (CP).
Figure 6:
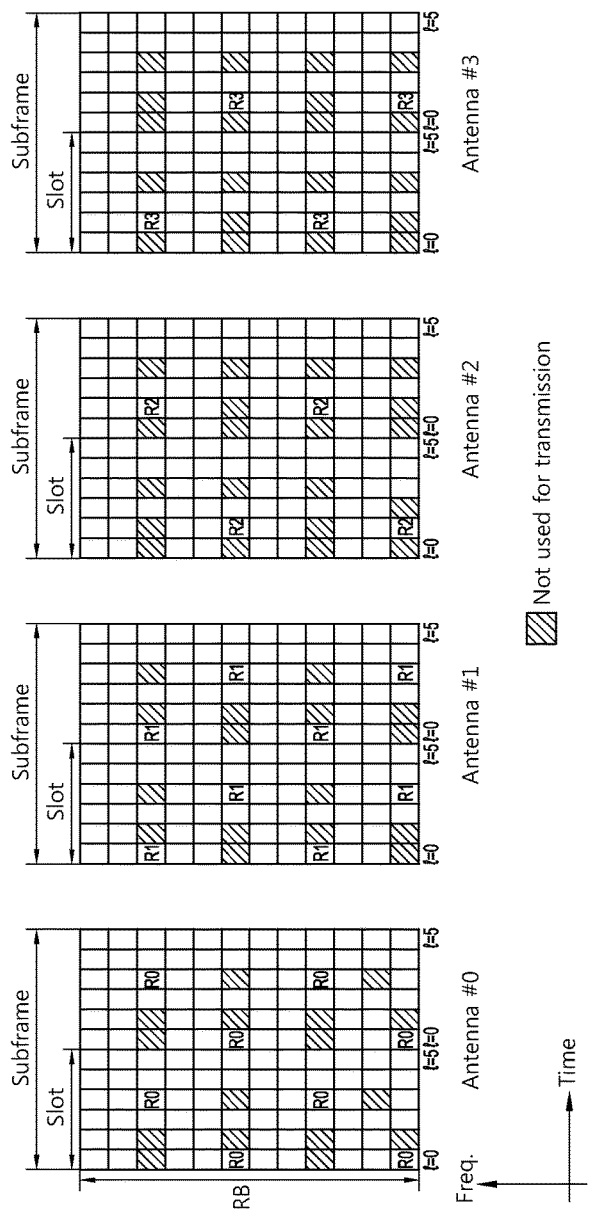
FIG. 6 shows exemplary mapping of common RSs for four antennas when using an extended CP.

FIG. 5 shows exemplary mapping of common RSs for four antennas when using a normal CP. FIG. 6 shows exemplary mapping of common RSs for four antennas when using an extended CP.

Referring to FIG. 5 and FIG. 6, Rp denotes a resource element used for RS transmission through an antenna #p (where p=0, 1, 2, 3). Hereinafter, the resource element used for RS transmission is referred to as a reference resource element. The resource element Rp is defined as a reference resource element for the antenna #p. The resource element Rp is used only for transmission through the antenna #p, and is not used for any other transmissions. In other words, a resource element used for RS transmission through a certain antenna in a subframe is not used for any other transmissions through other antennas in the same subframe, and may be set to '0'. This is to avoid interference between antennas.

For convenience of explanation, a minimum unit of an RS pattern in a time-frequency resource is hereinafter referred to as a basic unit. The RS pattern determines a location of a reference resource element in a time-frequency resource. If the basic unit is extended to a time domain and/or a frequency domain, the RS pattern is iterated. Herein, the basic unit is one subframe in the time domain and one resource block in the frequency domain.

A common RS may be transmitted in every DL subframe. One common RS is transmitted for each antenna. The common RS corresponds to a set of reference resource elements in a subframe. A BS may transmit the common RS by multiplying the common RS by a pre-defined common RS sequence.

An RS pattern of the common RS is referred to as a common RS pattern. Common RS patterns for the respective antennas are orthogonal to each other in the time-frequency domain. The common RS pattern is common to all UEs in a cell. The common RS sequence is also common to all UEs in the cell. However, to minimize inter-cell interference, each of the common RS pattern and the common RS sequence may be determined in a cell-specific manner.

The common RS sequence may be generated on an OFDM symbol basis in one subframe. The common RS sequence may differ according to a cell identifier (ID), a slot number in one radio frame, an OFDM symbol index in a slot, a CP length, etc.

In an OFDM symbol including a reference resource element in a basic unit, the number of reference resource elements for one antenna is 2. That is, in an OFDM symbol including the resource element Rp in the basic unit, the number of resource elements Rp is 2. A subframe includes N_DL resource blocks in the frequency domain. Therefore, in an OFDM symbol including the resource element Rp in the subframe, the number of resource elements Rp is 2×N_DL. Further, in the OFDM symbol including the resource element Rp in the subframe, a length of a common RS sequence for the antenna #p is 2×N_DL.

The following equation shows an example of a complex sequence r(m) generated for a common RS sequence in one OFDM symbol.

$$r(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N\_max, DL-1$$

Herein, N_max,DL denotes the number of resource blocks corresponding to a maximum downlink transmission bandwidth supported in the wireless communication system. In an LTE, N_max,DL is 110. If N_DL is less than N_max, DL, a certain part of a length of 2×N_DL may be used as a common RS sequence by being selected from a complex sequence generated to have a length of 2×N_max,DL. c(i) denotes a PN sequence. The PN sequence can be defined by a gold sequence having a length of 31. The following equation shows an example of c(i).

$$c(n)=(x(n+Nc)+y(n+Nc)) \bmod 2$$

$$x(n+31)=(x(n+3)+x(n)) \bmod 2$$

$$y(n+31)=(y(n+3)+y(n+2)+x(n+1)+x(n)) \bmod 2$$ [Equation 2]

Herein, Nc is 1600, x(i) is a first m-sequence, and y(i) is a second m-sequence. For example, the first m-sequence may be initialized to x(0)=1, x(i)=0(i=1, 2, . . . , 30) in the beginning of each OFDM symbol. The second m-sequence may be initialized in the beginning of each OFDM symbol according to a cell ID, a slot number in a radio frame, an OFDM symbol index in a slot, a CP length, etc.

The following equation shows an example of initialization of the second m-sequence.

$$\sum_{i=0}^{30} y(i) \cdot 2^i = 2^{10}(7(n\_s+1) + \ell + 1)(2N\_cell\_ID + 1) + 2N\_cell\_ID + N\_CP$$ [Equation 3]

Herein, n_s denotes a slot number in a radio frame, l denotes an OFDM symbol index in a slot, and N_cell_ID denotes a cell ID. In case of a normal CP, N_CP is 1. In case of an extended CP, N_CP is 0.

When the common RS sequence is generated according to the aforementioned equations, the common RS sequence is irrelevant to antennas. Therefore, if the common RS is transmitted for each of a plurality of antennas in the same OFDM symbol, each of the plurality of antennas uses the same common RS sequence.

The common RS sequence generated for each OFDM symbol including the reference resource element is mapped to the reference resource element according to a common RS pattern. The common RS sequence may be sequentially mapped to the reference resource element in an ascending order of a subcarrier index. In this case, the common RS sequence is generated for each antenna, and the common RS sequence is mapped to the reference resource element for each antenna.

Figure 7:
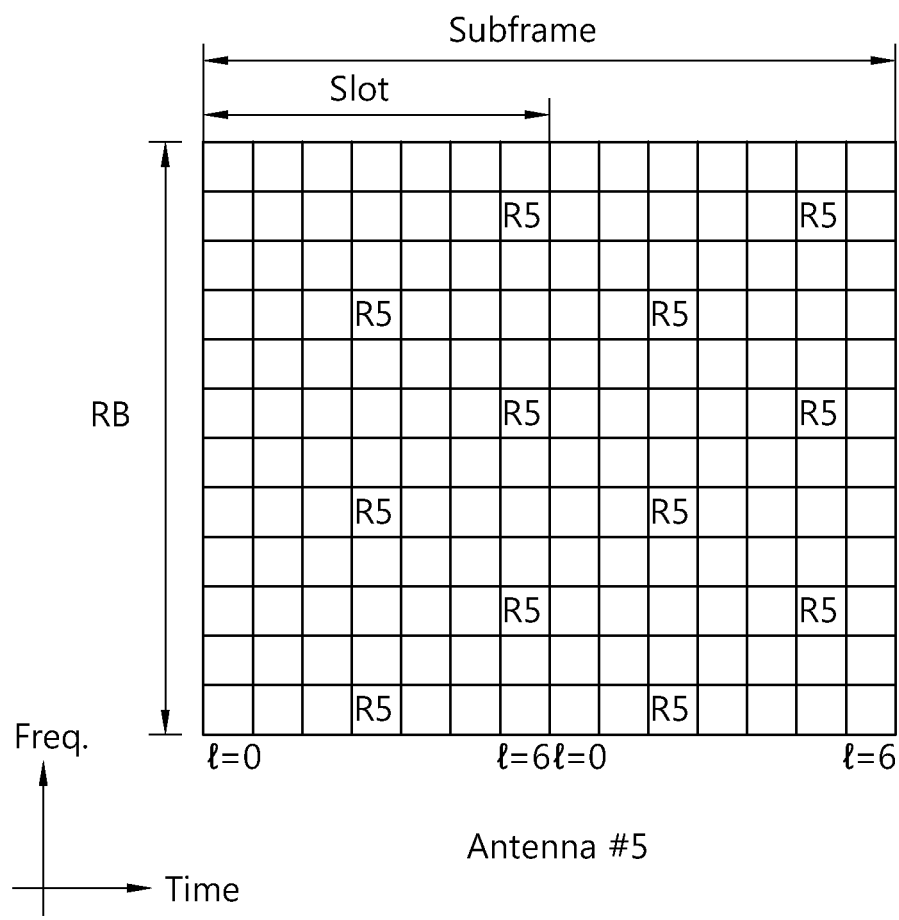
FIG. 7 shows exemplary mapping of a dedicated RS in a long term evolution (LTE) when using a normal CP.
Figure 8:
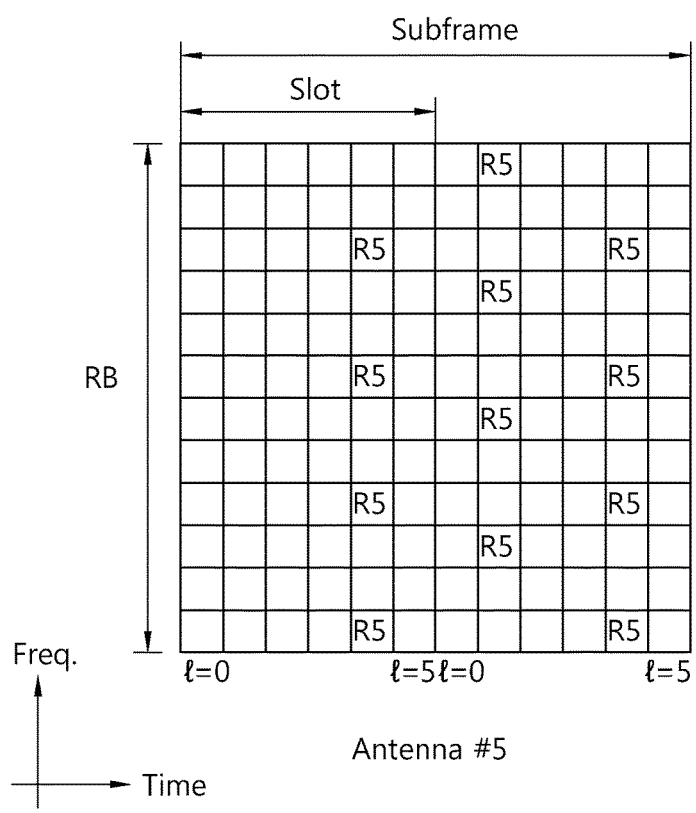
FIG. 8 shows exemplary mapping of a dedicated RS in an LTE when using an extended CP.

FIG. 7 shows exemplary mapping of a dedicated RS in an LTE when using a normal CP. FIG. 8 shows exemplary mapping of a dedicated RS in an LTE when using an extended CP.

Referring to FIG. 7 and FIG. 8, R5 denotes a resource element used for dedicated RS transmission through an antenna #5. In the LTE, the dedicated RS is supported for single antenna transmission. Only when single antenna transmission through the antenna #5 is configured by a higher layer as DL data transmission over a PDSCH, the dedicated RS can exist and be useful for PDSCH demodulation. The dedicated RS may be transmitted only over a resource block to which the PDSCH is mapped. The dedicated RS corresponds to a set of reference resource elements in the resource block to which the PDSCH is mapped. A BS may transmit the dedicated RS by multiplying the dedicated RS by a pre-defined dedicated RS sequence. Herein, a basic unit is one subframe in a time domain and one resource block in a frequency domain.

The dedicated RS may be transmitted simultaneously with the common RS. Therefore, an RS overhead becomes significantly greater in comparison with an RS overhead for a case where only the common RS signal is transmitted. A UE may use the common RS and the dedicated RS together. In a control region for transmitting control information in a subframe, the UE uses the common RS. In a data region existing in the subframe other than the control region, the UE may use the dedicated RS. For example, the control region consists of OFDM symbols of which an OFDM symbol index l is 0 to 2 in a first slot of the subframe (see FIG. 4).

A dedicated RS pattern is an RS pattern of a dedicated RS and may be common to all UEs in a cell. However, to minimize inter-cell interference, the dedicated RS pattern may be determined in a cell-specific manner. The dedicated RS sequence may be determined in a UE-specific manner. Therefore, only a specific UE in the cell can receive the dedicated RS.

The dedicated RS sequence may be generated on a subframe basis. The dedicated RS sequence may differ according to a cell ID, a subframe location in one radio frame, a UE ID, etc.

The number of reference resource elements for the dedicated RS in a basic unit is 12. That is, the number of resource elements R5 in the basic unit is 12. If N_PDSCH denotes the number of resource blocks to which the PDSCH is mapped, the total number of resource elements R5 for the dedicated RS is 12×N_PDSCH. Therefore, a length of the dedicated RS sequence is 12×N_PDSCH. The length of the dedicated RS sequence may differ according to the number of resource blocks allocated to the UE for PDSCH transmission.

The following equation shows an example of a dedicated RS sequence r(m).

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12 \times N\_PDSCH - 1$$

[Equation 4]

Herein, c(i) denotes a PN sequence. c(i) may be determined by Equation 2 above. In this case, the second m-sequence may be initialized in the beginning of each subframe according to a cell ID, a subframe location in one radio frame, a UE ID, etc.

The following equation shows an example of initialization of the second m-sequence.

$$\sum_{i=0}^{30} y(i) \cdot 2^i = (\lfloor n\_s/2 \rfloor + 1) \cdot (2N\_cell\_ID + 1) \cdot 2^{16} + UE\_ID$$

[Equation 5]

Herein, n_s denotes a slot number in a radio frame, N_cell_ID denotes a cell ID, and UE_ID denotes a UE ID.

The dedicated RS sequence is mapped to the reference resource element according to the RS pattern in a resource block to which the PDSCH is mapped. In this case, the dedicated RS sequence is sequentially mapped in the resource block in an ascending order of a subcarrier, and is then mapped to a reference resource element in an ascending order of an OFDM symbol index.

A common RS structure and a dedicated RS structure of the LTE system have been described above. In downlink, the LTE system supports transmission of 1, 2, or 4 antennas. That is, a UE to which the LTE system is applied (hereinafter, an LTE UE) can receive a signal transmitted by using up to four Tx antennas. The common RS structure of the LTE system is designed to be capable of channel estimation of up to four Tx antennas.

On the other hand, the LTE-A system can support up to 8 Tx antennas. That is, a UE to which the LTE-A system is applied (hereinafter, an LTE-A UE) can receive a signal transmitted by using up to 8 Tx antennas. Therefore, the LTE-A system needs to transmit a reference signal to enable channel estimation of up to 8 Tx antennas.

However, the LTE UE and the LTE-A UE may coexist in a cell.

Therefore, the LTE-A system is preferably designed such that the LTE UE and the LTE-A UE are both supported for backward compatibility. Herein, the LTE system and the LTE-A system are for exemplary purposes only. In general, a system of which the number of Tx antennas supported in downlink is greater than that of a first system can be defined as a second system. Then, the first system may be LTE, IEEE 802.16e systems for example, and the second systems for the respective first systems may be LTE-A, IEEE 802.16m systems. That is, different types of UEs can exist in a cell. Regarding the different types of UEs, it is preferable to transmit a suitable reference signal according to a UE type.

In addition, UEs existing in the cell may operate according to different transmission schemes. The transmission scheme may be a method of transmitting downlink data by a BS to a UE. Examples of the transmission scheme include a single-antenna scheme, a MIMO scheme, etc. Examples of the MIMO scheme include a transmit diversity scheme, an open-loop spatial multiplexing scheme, a closed-loop spatial multiplexing scheme, and a multiple user-MIMO (MU-MIMO) scheme.

Uplink control information that is fed back by the UE to the BS may vary depending on the transmission scheme. Examples of channel information to be fed back include a channel quality indicator (CQI), a precoding matrix indicator (PMI), a rank indicator (RI), etc.

The CQI provides information on a link adaptive parameter that can be supported by the UE for a given time. Any one of the following compression schemes can be used in CQI transmission.

1. Wideband feedback: Wideband feedback is a scheme in which one CQI value is fed back for a full system band. 2. UE-selected sub-band feedback: UE-selected sub-band feedback is a scheme in which a UE estimates channel quality of each sub-band and thereafter selects a plurality of sub-bands having good quality. In addition, an average CQI value is fed back for the plurality of selected sub-bands. 3. Higher-layer configured sub-band feedback: Higher-layer configured sub-band feedback is a scheme in which an individual CQI is fed back for each sub-band configured in a higher layer.

The PMI provides information for a precoding matrix in codebook-based precoding. The PMI is in association with multiple input multiple output (MIMO). When the PMI is fed back in MIMO, it is called closed-loop MIMO. A DL transmission mode can be classified into 7 modes as follows. Among them, PMI feedback is used only in closed-loop spatial multiplexing, multi-user MIMO, and closed-loop rank-1 precoding.

1. Single-antenna port: This is a mode in which precoding is not performed.

2. Transmit diversity: Transmit diversity can be used in 2 or 4 antenna ports using SFBC.

3. Open-loop spatial multiplexing: This is an open-loop mode in which rank adaptation based on RI feedback is possible. The transmit diversity is applicable when a rank is 1. A great delay CDD can be used when the rank is greater than 1.

4. Closed-loop spatial multiplexing: This is a mode in which precoding feedback supporting dynamic rank adaptation is applied.

5. Multi-user MIMO

6. Closed-loop rank-1 precoding

7. Single-antenna port: This is a mode that can be used for beamforming when a UE-specific reference signal is used.

The RI is information for the number of layers recommended by the UE. That is, the RI indicates the number of streams used in spatial multiplexing. The RI is fed back only when it operates in a MIMO mode in which the UE uses spatial multiplexing. That is, the RI is fed back only in the DL transmission modes 3, and 4 among the aforementioned DL transport modes. For example, the RI is not transmitted in the single-antenna port mode or the transmit diversity mode. The RI may be 1 or 2 in a 2×2 antenna configuration, and may be any one of values 1 to 4 in a 4×4 antenna configuration. The RI is also in association with one or more CQI feedbacks. That is, a specific RI value is assumed in calculation of the CQI to be fed back. A rank of a channel changes slowly in general in comparison with the CQI, and thus the RI is fed back in a less number of times than the CQI. An RI transmission periodicity may be a multiple of a CQI/PMI transmission periodicity. The RI is given for a full system band, and a frequency selective RI feedback is not supported.

A method of transmitting the UL control information includes a periodic transmission method and a non-periodic transmission method. In the periodic transmission, the UL control information is transmitted through the PUCCH in general, but it may also be transmitted through the PUSCH. If the BS requires further detailed channel state information, the non-periodic transmission is performed by requesting the UE to transmit the information. The non-periodic transmission is performed through the PUSCH. Since the PUSCH is used, a channel state can be reported with a greater capacity and in a more detailed manner. When the periodic transmission and the non-periodic transmission collide with each other, only the non-periodic transmission is performed. Alternatively, it is also possible to configure such that the periodic transmission and the non-periodic transmission can be performed simultaneously. The transmission scheme can be configured semi-statically through higher layer signaling such as radio resource control (RRC) signaling.

As described above, the maximum number of Tx antennas supported for each UE existing in the cell may differ and a transmission scheme thereof may also differ. A reference signal transmission method and apparatus capable of transmitting a suitable reference signal to each UE in such an environment will be described. The following description is applicable not only to the LTE-A system but also to the typical OFDM-MIMO system. First, a structure of a transmitter according to the present invention will be described.

Figure 9:
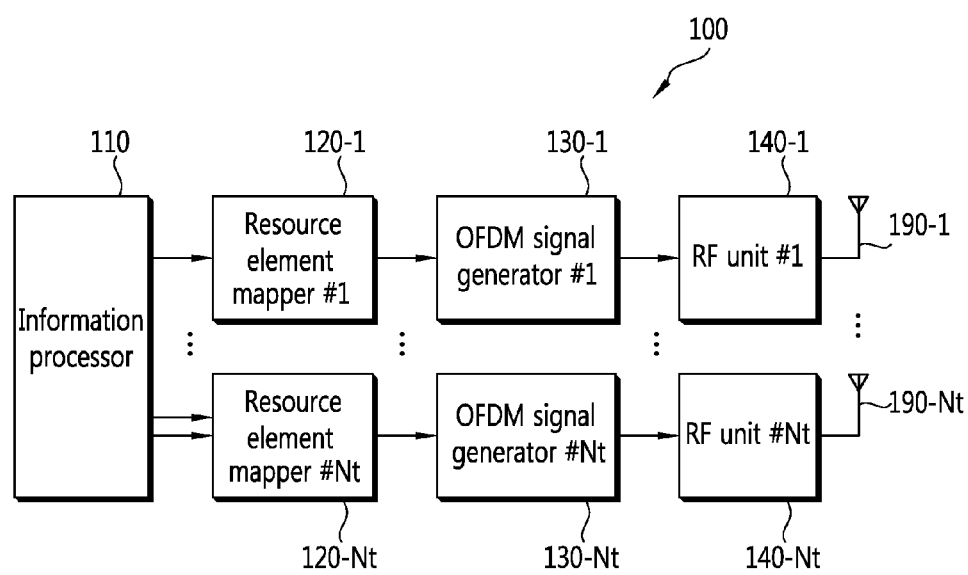
FIG. 9 is a block diagram showing an exemplary structure of a transmitter according to an embodiment of the present invention.

FIG. 9 is a block diagram showing an exemplary structure of a transmitter according to an embodiment of the present invention. The transmitter may be a part of a UE or a BS.

Referring to FIG. 9, a transmitter 100 includes an information processor 110, Nt resource element mappers 120-1, . . . , 120-Nt, Nt OFDM signal generators 130-1, . . . , 130-Nt, Nt radio frequency (RF) units 140-1, . . . , 140-Nt, and Nt Tx antennas 190-1, . . . , 190-Nt (where Nt is a natural number).

The information processor 110 is coupled to each of the Nt resource element mappers 120-1, . . . , 120-Nt. The Nt resource element mappers 120-1, . . . , 120-Nt are respectively coupled to the Nt OFDM signal generators 130-1, . . . , 130-Nt. The Nt OFDM signal generators 130-1, . . . , 130-Nt are respectively coupled to the Nt RF units 140-1, . . . , 140-Nt. The Nt RF units 140-1, . . . , 140-Nt are respectively coupled to the Nt Tx antennas 190-1, . . . , 190-Nt. That is, a resource element mapper #n 120-n is coupled to an OFDM signal generator #n 130-n, the OFDM symbol generator #n 130-n is coupled to an RF unit #n 140-n, and the RF unit #n 140-n is coupled to a Tx antenna #n 190-n (where n=1, . . . , Nt). In case of multiple antenna transmission, one resource grid is defined for each Tx antenna.

Information is input to the information processor 110. The information may be control information or data. The information may have a format of a bit or a bit-stream. The transmitter 100 can be implemented in a physical layer. In this case, the information may be derived from a higher layer such as a medium access control (MAC) layer.

The information processor 110 is configured to generate Nt transmit streams #1, #2, . . . , #Nt from the information. Each of the Nt transmit streams includes a plurality of transmit symbols. The transmit symbol may be a complex-valued symbol obtained by processing the information.

The Nt resource element mappers 120-1, . . . , 120-Nt are configured to receive the respective Nt transmit streams. That is, the resource element mapper #n 120-n is configured to receive a transmit stream #n. The resource element mapper #n 120-n is configured to map the transmit stream #n to resource elements in a resource block allocated for information transmission. Each transmit symbol of the transmit stream #n may be mapped to one resource element. '0' may be inserted to a resource element to which the transmit stream #n is not mapped.

One or more resource blocks may be allocated for information transmission. If a plurality of resource blocks are allocated, the plurality of resource blocks may be allocated either continuously or discontinuously.

Each of the Nt OFDM signal generators 130-1, . . . , 130-Nt is configured to generate a time-continuous OFDM signal for each OFDM symbol. The time-continuous OFDM signal is also referred to as an OFDM baseband signal. Each of the Nt OFDM signal generators 130-1, . . . , 130-Nt may generate an OFDM signal by performing inverse fast Fourier transform (IFFT), CP insertion, or the like on each OFDM symbol.

Each of the Nt RF units 140-1, . . . , 140-Nt converts its OFDM baseband signal into a radio signal. The OFDM baseband signal may be converted into the radio signal by performing up-conversion at a carrier frequency. The carrier frequency is also referred to as a center frequency. The transmitter 100 may use either a single carrier or multiple carriers.

Radio signals are respectively transmitted through the Nt Tx antennas 190-1, . . . , 190-Nt.

Figure 10:
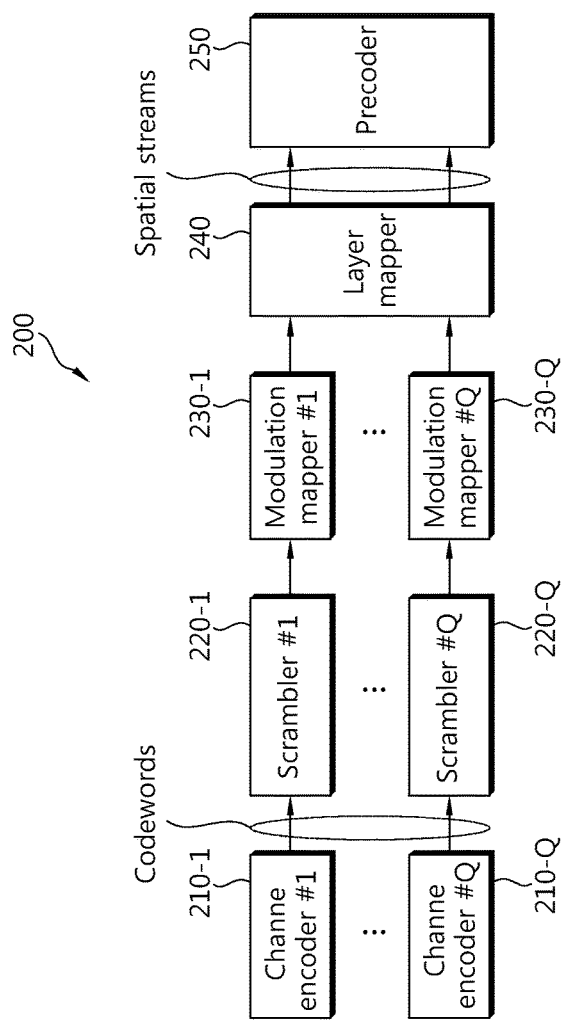
FIG. 10 is a block diagram showing an exemplary structure of an information processor of FIG. 9.

FIG. 10 is a block diagram showing an exemplary structure of the information processor of FIG. 9.

Referring to FIG. 10, an information processor 200 includes Q channel encoders 210-1, . . . , 210-Q, Q scramblers 220-1, . . . , 220-Q, Q modulation mappers 230-1, . . . , 230-Q, a layer mapper 240, and a precoder 250.

The Q channel encoders 210-1, . . . , 210-Q are respectively coupled to the Q scramblers 220-1, . . . , 220-Q. The Q scramblers 220-1, . . . , 220-Q are respectively coupled to the plurality of modulation mappers 230-1, . . . , 230-Q. The plurality of modulation mappers 230-1, . . . , 230-Q are coupled to the layer mapper 240. The layer mapper 240 is coupled to the precoder 250. The precoder 250 is coupled to Nt resource element mappers (see FIG. 9).

A channel encoder #q 210-q is coupled to a scrambler #q 220-q, and the scrambler #q 220-q is coupled to a modulation mapper #q 230-q (where q=1, . . . , Q).

Each of the Q channel encoders 210-1, . . . , 210-Q is configured to receive information bit, and to generate an encoded bit by performing channel coding on the information bit. The information bit corresponds to information to be transmitted by a transmitter. A size of the information bit may be various according to the information. A size of the encoded bit may also be various according to the size of the information bit and a channel coding scheme. There is no restriction on the channel coding scheme. Examples of the channel coding scheme may include turbo coding, convolution coding, block coding, etc. An encoded bit obtained by performing channel coding on the information bit is referred to as a codeword. Herein, Q denotes the number of codewords. The channel encoder #q 210-$q$ outputs a codeword #q (where q=1, . . . , Q).

Each of the Q scramblers 220-1, . . . , 220-Q is configured to generate a scrambled bit for each codeword. The scrambled bit is generated by scrambling the encoded bit with a scrambling sequence. The scrambler #q 220-$q$ is configured to generate a scrambled bit for the codeword #q (where q=1, . . . , Q).

Each of the Q modulation mappers 230-1, . . . , 230-Q is configured to generate a modulation symbol for each codeword. The modulation symbol may be complex-valued symbol. The modulation mapper #q 230-$q$ is configured to generate a modulation symbol by mapping the scrambled bit for the codeword #q to a symbol for representing a location on a signal constellation (where q=1, . . . , Q). There is no restriction on a modulation scheme. For example, the modulation scheme may be m-phase shift keying (PSK) or m-quadrature amplitude modulation (QAM). The number of modulation symbols output from the modulation mapper #q 230-$q$ for the codeword #q may be various according to a size of the scrambled bit and the modulation scheme.

The layer mapper 240 is configured to map a modulation symbol for each codeword to R spatial layers. The modulation symbol may be mapped to the spatial layers in various manners. R spatial streams are generated as a result. Herein, R denotes a rank. The rank R may be equal to or greater than the number Q of codewords.

The precoder 250 is configured to generate Nt transmit streams by performing precoding on the R spatial streams. The number Nt of Tx antennas is equal to or less than the rank R.

The Nt transmit streams generated by the precoder 250 are respectively input to the Nt resource element mappers (see FIG. 9). The Nt transmit streams are respectively transmitted through the Nt Tx antennas. That is, a transmit stream #n is input to a resource element mapper #n, and is transmitted through a Tx antenna #n (where n=1, 2, . . . , Nt).

As such, a MIMO scheme in which multiple spatial streams are simultaneously transmitted through a plurality of Tx antennas is referred to as spatial multiplexing. The spatial multiplexing includes single-user spatial multiplexing and multi-user spatial multiplexing. The single-user spatial multiplexing is referred to as single user (SU)-MIMO. The multi-user spatial multiplexing is referred to as multi user (MU)-MIMO. The MU-MIMO can be supported in both uplink and downlink.

In case of the SU-MIMO, a plurality of spatial layers are all allocated to one UE. Through the plurality of spatial layers allocated to one UE, the multiple spatial streams are transmitted by using the same time-frequency resource.

In case of the MU-MIMO, a plurality of spatial layers are allocated to a plurality of UEs. The multiple spatial streams allocated to the plurality of UEs are transmitted by using the same time-frequency resource. A different spatial layer is allocated to a different UE. If R denotes a rank, R spatial streams can be allocated to K UEs (where 2≤K≤R, and K is a natural number). Each of the K UEs simultaneously shares a time-frequency resource used for multiple spatial stream transmission.

A CSI-RS transmitted from the transmitter to measure a spatial channel in the multi-antenna system may have any one of a plurality of types. For example, the CSI-RS may be a precoded RS type or a non-precoded RS type.

In case of an RS type in which a CSI-RS is not precoded (hereinafter, a non-precoded CSI-RS), transmission can be performed always by the number of Tx antennas irrespective of the number of spatial layers. The non-precoded CSI-RS has an independent reference signal for each Tx antenna.

If the CSI-RS is a precoded RS type (hereinafter, a precoded CSI-RS), transmission can be performed by the number of spatial layers. The precoded CSI-RS has an independent reference signal for each spatial layer.

Figure 11:
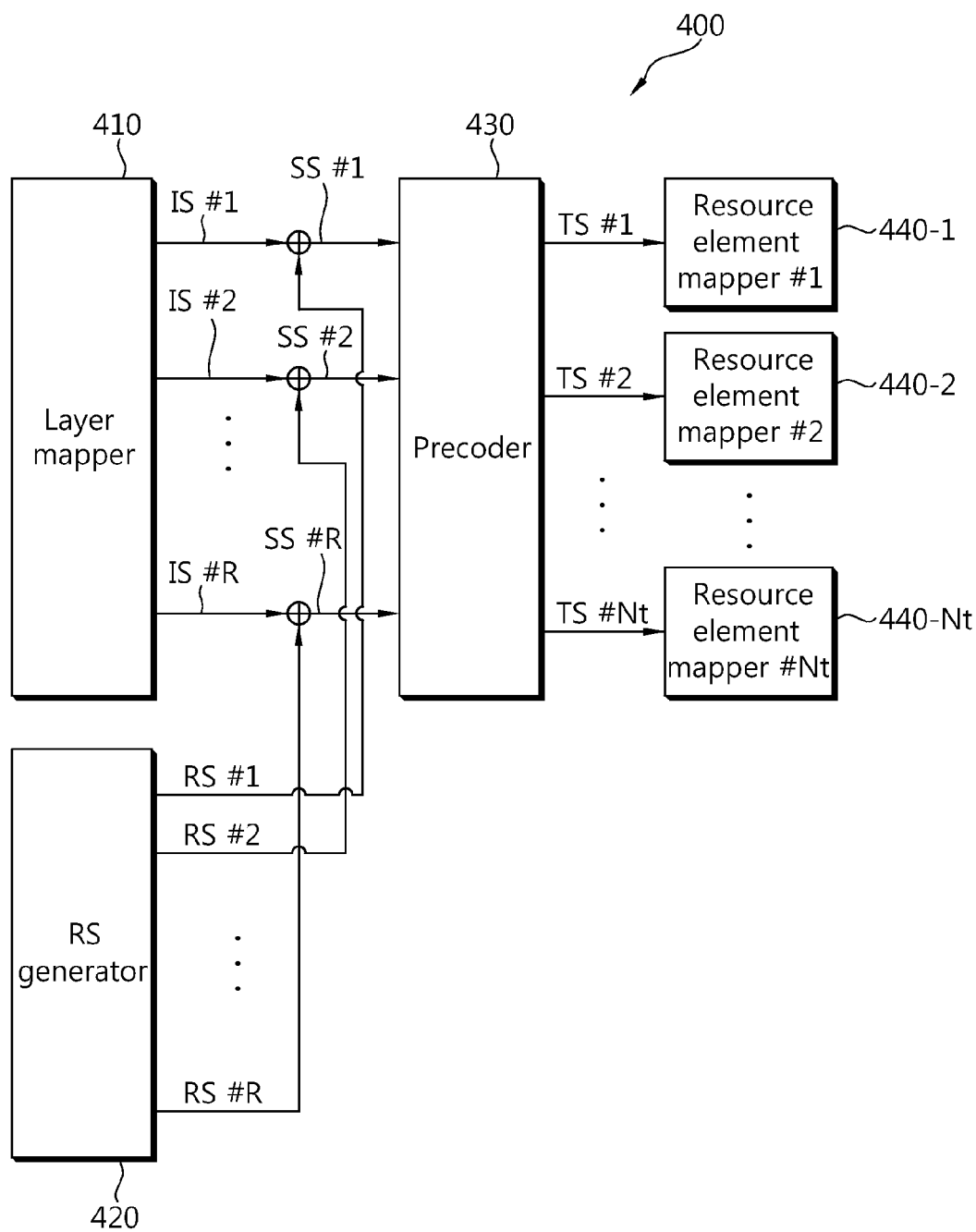
FIG. 11 is a block diagram showing an exemplary structure of a transmitter for generating a non-precoded channel state information-RS (CSI-RS).

FIG. 11 is a block diagram showing an exemplary structure of a transmitter for generating a non-precoded CSI-RS.

Referring to FIG. 11, a transmitter 300 includes a layer mapper 310, a precoder 320, an RS generator 330, and Nt resource element mappers 340-1, . . . , 340-Nt. Herein, Nt denotes the number of Tx antennas of the transmitter 300. It is assumed that the number of spatial layers is R.

The layer mapper 310 is coupled to the precoder 320. Each of the precoder 320 and the RS generator 330 is coupled to the Nt resource element mappers 340-1, . . . , 340-Nt.

The layer mapper 310 is configured to generate R spatial streams SS #0, SS #1, . . . , SS #R−1 for the R spatial layers.

The precoder 320 is configured to generate Nt transmit streams TS #1, TS #2, . . . , TS #Nt by performing precoding on the R spatial streams.

The RS generator 330 generates an RS sequence in association with an RS. The RS sequence consists of a plurality of reference symbols. Any sequence may be used for the RS sequence, without any particularly restriction.

The RS generator 330 is configured to generate an RS sequence for each of the Nt Tx antennas. The RS generator 330 is configured to generate Nt RS sequences RS #1, RS #2, . . . , RS #Nt. Each of the Nt RS sequences includes a plurality of RS symbols. The RS symbol may be a complex-valued symbol.

Each of the Nt resource element mappers 340-1, . . . , 340-Nt is configured to receive a transmit stream and an RS sequence and to map the transmit stream and the RS sequence to resource elements. A resource element mapper #n 340-$n$ may receive a TS #n and an RS #n and map them to resource elements (where n=1, 2, . . . , Nt).

That is, the non-precoded CSI-RS can be transmitted without using the precoder, and can be used as a reference signal for a physical antenna.

Figure 12:
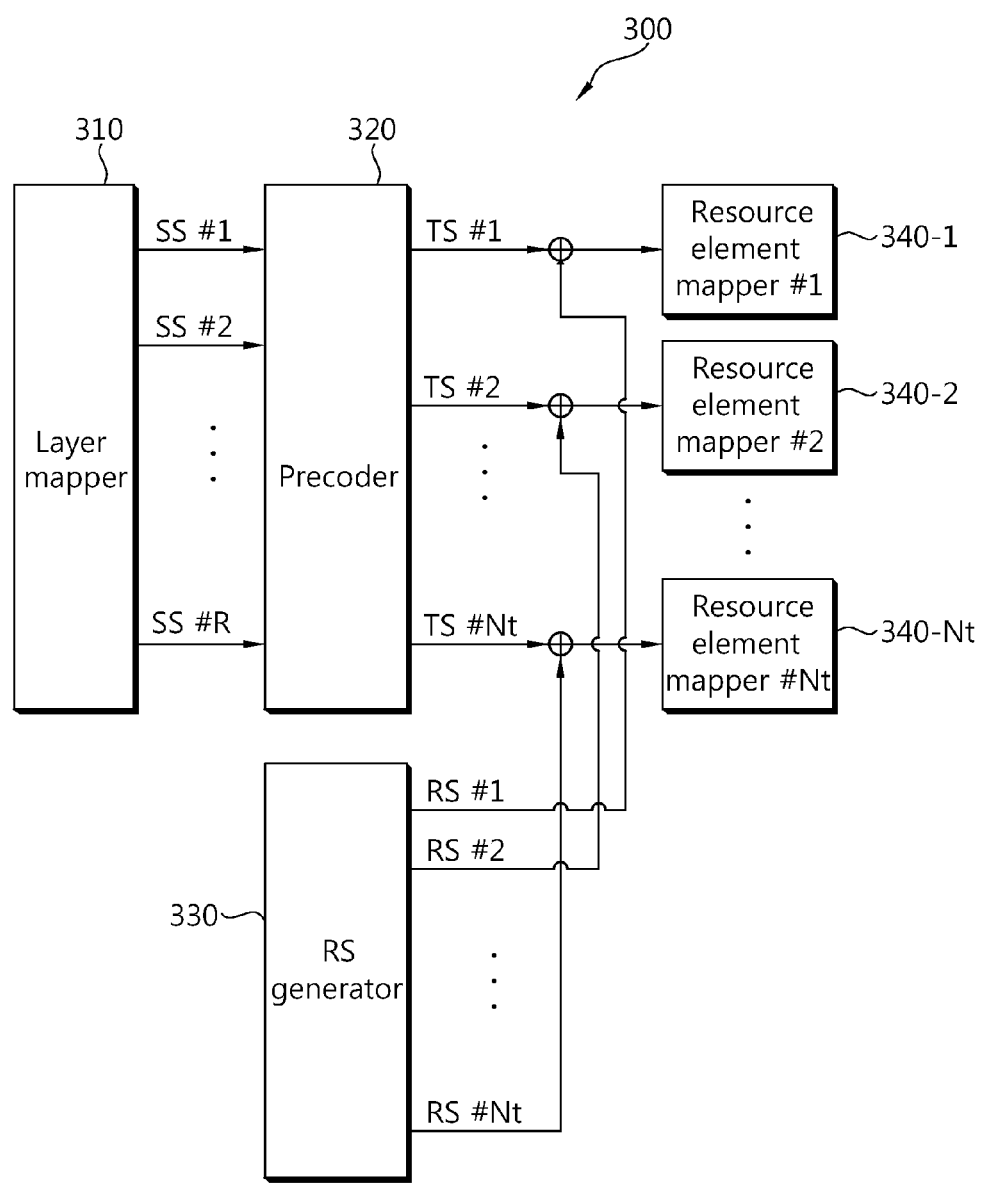
FIG. 12 is a block diagram showing an exemplary structure of a transmitter for generating a precoded CSI-RS.

FIG. 12 is a block diagram showing an exemplary structure of a transmitter for generating a precoded CSI-RS.

Referring to FIG. 12, a transmitter 400 includes a layer mapper 410, an RS generator 420, a precoder 430, and Nt resource element mappers 440-1, . . . , 440-Nt. Herein, Nt denotes the number of Tx antennas of the transmitter 400. It is assumed that the number of spatial layers is R.

Each of the layer mapper 410 and the RS generator 420 is coupled to the precoder 430. The precoder 430 is coupled to the Nt resource element mappers 440-1, . . . , 440-Nt. The layer mapper 410 is configured to generate R information streams. The R information streams can be expressed by IS #0, IS #1, . . . , IS #R−1.

The RS generator 420 is configured to generate R RS sequences. The R RS sequences can be expressed by RS #0, RS #1, . . . , RS #R−1. Each of the R RS sequences includes a plurality of RS symbols. The RS symbol may be a complex-valued symbol.

An information stream, an RS sequence, and an RS pattern are allocated to each of the R spatial layers. An IS #r and an RS #r are allocated to a spatial layer #r (where r=0, 1, . . . , R−1). Herein, r denotes a spatial layer index indicating a spatial layer. An RS pattern allocated to the spatial layer #r is a time-frequency resource pattern used for RS #r transmission.

The precoder 430 is configured to generate Nt transmit streams by performing precoding on R spatial streams. The R spatial streams can be expressed by SS #0, SS #1, . . . , SS #R−1. The Nt transmit streams can be expressed by TS #1, TS #2, . . . , TS #Nt.

Each of the R spatial streams corresponds to one spatial layer. That is, an SS #r corresponds to a spatial layer #r (where r=0, 1, . . . , R−1). Each of the R spatial streams is generated based on an information stream, RS sequence, RS pattern allocated to a corresponding spatial layer. That is, the SS #r is generated based on the IS #r, the RS #r, and an RS pattern allocated to spatial layer #r.

That is, the precoded CSI-RS is transmitted by using the precoder.

The CSI-RS transmitted from the transmitter can be transmitted with an RS type for a virtual antenna with virtualization or can be transmitted with an RS type for a physical antenna without virtualization.

The precoder is used for a specific UE in general. If a cell specific precoder is present in a specific system, it is regarded not as precoding but as virtualization. In this case, the precoded CSI-RS can be generated with virtualization, and the non-precoded CSI-RS can be generated without virtualization. The precoded CSI-RS functions as a reference signal for a virtual antenna, and the non-precoded CSI-RS functions as a reference signal for a physical antenna.

Figure 13:
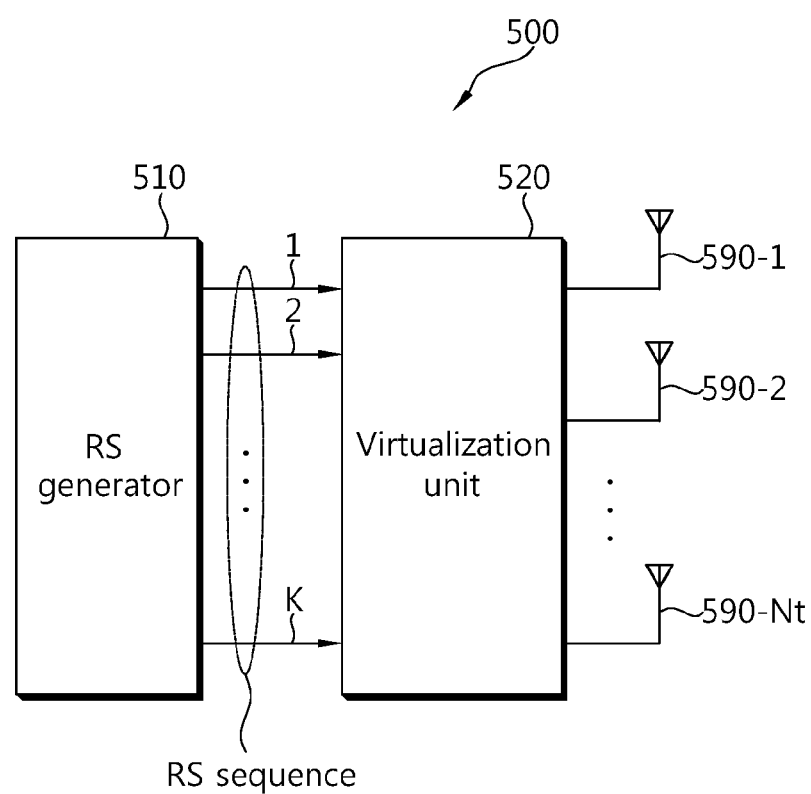
FIG. 13 is a block diagram showing an exemplary structure of a transmitter for generating a precoded CSI-RS by using an antenna virtualization scheme.

FIG. 13 is a block diagram showing an exemplary structure of a transmitter for generating a precoded CSI-RS by using an antenna virtualization scheme. Herein, the transmitter may be a part of a BS or UE.

Referring to FIG. 13, a transmitter 500 includes an RS generator 510, a virtualization unit 520, and Nt Tx antennas 590-1, . . . , 590-Nt. The Nt Tx antennas 590-1, . . . , 590-Nt are physical antennas. The RS generator 510 is coupled to the virtualization unit 520, and the virtualization unit 520 is coupled to the Nt Tx antennas 590-1, . . . , 590-Nt.

The RS generator 510 is configured to generate K RS sequences (where K<Nt).

The virtualization unit 520 is configured to generate K RS sequence vectors by mapping the K RS sequences to respective K virtual antennas. One RS sequence vector can be generated by mapping one RS sequence to one virtual antenna. The K RS sequence vectors are transmitted respectively through the Nt Tx antennas 590-1, . . . , 590-Nt.

As such, the transmitter 500 including Nt Tx antennas can transmit a reference signal through K virtual antennas by using antenna virtualization. From the perspective of the UE, it is viewed that the reference signal is transmitted through K antennas. For example, in the LTE-A system, a BS including 8 Tx antennas can transmit a precoded CSI-RS through 1, 2, or 4 virtual antennas by using antenna virtualization.

Figure 14:
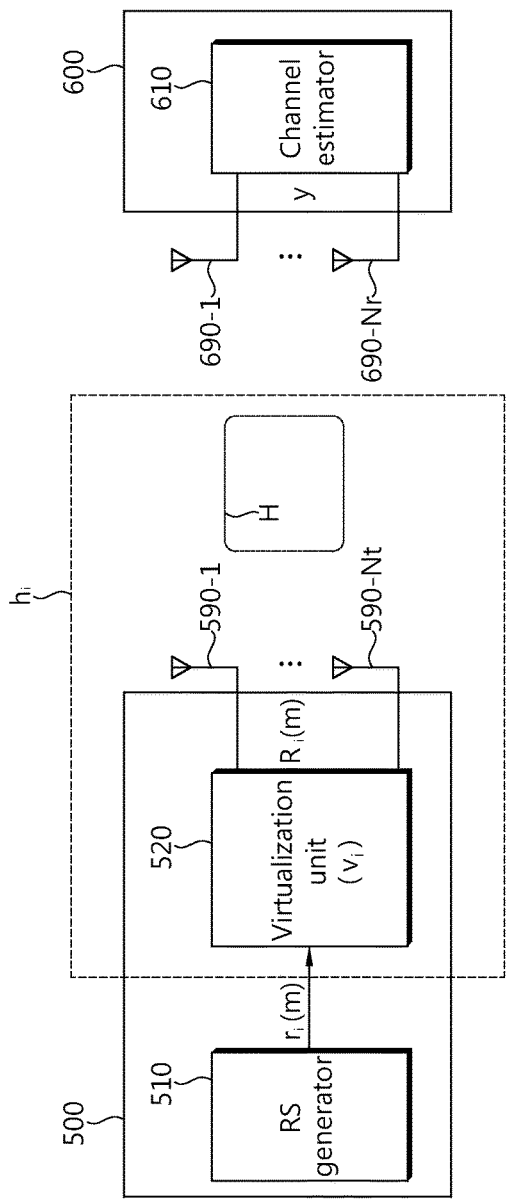
FIG. 14 is a block diagram showing an exemplary structure of a wireless communication system for transmitting a reference signal through one virtual antenna.

FIG. 14 is a block diagram showing an exemplary structure of a wireless communication system for transmitting a reference signal through one virtual antenna.

Referring to FIG. 14, a transmitter 500 includes an RS generator 510, a virtualization unit 520, and Nt Tx antennas 590-1, . . . , 590-Nt (where Nt is a natural number). The Nt Tx antennas 590-1, . . . , 590-Nt are physical antennas. The RS generator 510 is coupled to the virtualization unit 520, and the virtualization unit 520 is coupled to the Nt Tx antennas 590-1, . . . , 590-Nt. A receiver 600 includes a channel estimator 610 and Nr Rx antennas 690-1, . . . , 690-Nr. The transmitter 500 may be a part of a BS, and the receiver 600 may be a part of a UE.

A MIMO channel matrix H is formed between the Nt Tx antennas 590-1, . . . , 590-Nt and the Nr Rx antennas 690-1, . . . , 690-Nr. The MIMO channel matrix H has a size of Nr×Nt. If the number of Rx antennas is 1, the MIMO channel matrix is a row vector. In general, a matrix conceptually includes a row vector as well as the column vector.

The RS generator 510 is configured to generate an RS sequence #i($r_i(m)$). The RS sequence #i($r_i(m)$) is an RS sequence mapped based on an RS pattern #i. Herein, i is a pattern index that indicates an RS pattern. m can be in accordance with a time-frequency resource index. The RS pattern is a time-frequency resource pattern used for RS sequence transmission.

Alternatively, the RS sequence #i($r_i(m)$) may be an RS sequence mapped based on an RS pattern for a Tx antenna #i (where i=0, 1, . . . , Nt−1). In this case, a different RS pattern may be used for each of the Nt Tx antennas.

The virtualization unit 520 is configured to map the RS sequence #i($r_i(m)$) to a virtual antenna #i. In order to map the RS sequence #i($r_i(m)$) to the virtual antenna #i, a virtual antenna matrix V is used. The virtual antenna matrix can be regarded as a precoder, and can be implemented transparently to the UE.

The number of rows of the virtual antenna matrix may be equal to the number of physical Tx antennas. The number of columns of the virtual antenna matrix may be equal to the number of virtual antennas. If a reference signal for the LTE-A UE is transmitted using a virtual antenna mapping scheme, Nt virtual antennas can also be configured. In this case, a size of the virtual antenna is Nt×Nt.

The following equation shows an example of the virtual antenna matrix if Nt is 8.

$$V = (v_0 \ v_1 \ \ldots \ v_7) = \begin{pmatrix} v_{00} & v_{10} & \cdots & v_{70} \\ v_{01} & v_{11} & \cdots & v_{71} \\ \vdots & \vdots & \ddots & \vdots \\ v_{07} & v_{17} & \cdots & v_{77} \end{pmatrix} \quad \text{[Equation 6]}$$

Herein, $v_i$ denotes a virtual antenna vector #i for mapping a reference signal to a virtual antenna #i as an $i^{th}$ column vector of the virtual antenna matrix. $v_{ij}$ denotes a complex coefficient of the virtual antenna matrix (where i∈{0, 1, . . . , 7}, j∈{0, 1, . . . , 7}). The complex coefficient can be configured in various formats according to a situation.

The virtual antenna matrix can be configured in a unitary matrix format. If the virtual antenna matrix is a unitary matrix, power can be distributed uniformly to all Tx antennas.

An RS sequence vector #i in which the RS sequence #i is mapped to the virtual antenna #i can be expressed by the following equation.

$$R_i(m) = v_i * r_i(m), \ i=0, \ldots, 7 \quad \text{[Equation 7]}$$

Herein, $r_i(m)$ denotes an RS sequence #i, $v_i$ denotes a virtual antenna vector #i as an $i^{th}$ column vector of the virtual antenna matrix, and $R_i(m)$ denotes an RS sequence vector #i.

The transmitter 500 transmits the RS sequence vector #i($R_i(m)$) through the Nt Tx antennas 590-1, ..., 590-Nt.

The receiver 600 receives an Rx signal vector $y=[y_1\ y_2\ ...\ y_{Nr}]^T$ through the Nr Rx antennas 690-1, ..., 690-Nr. The Rx signal vector y can be expressed by the following equation.

$$y = Hv_i r_i(m) + n \qquad \text{[Equation 8]}$$
$$= h_i r_i(m) + n$$

Herein, $n = [n_1\ n_2\ ...\ n_{Nr}]^T$ denotes a noise vector.

The channel estimator 610 is configured to estimate a virtual antenna channel #i($h_i$) which is a virtual antenna channel of the virtual antenna #i from an Rx signal vector. Since the channel estimator 610 is aware of the RS sequence #i($R_i(m)$), the channel estimator 610 can estimate the virtual antenna channel #i($h_i$).

Although it is shown herein that one RS sequence is transmitted through one virtual antenna, it is also possible to transmit K RS sequences through K virtual antennas. If transmission of K antennas is applied to the LTE UE, the BS can configure Nt virtual antennas and then transmit a reference signal by selecting K virtual antennas.

K RS sequence vectors can be transmitted respectively based on K RS sequences and K virtual antenna vectors, and the K RS sequence vectors can be transmitted respectively through Nt Tx antennas. Herein, each of the K virtual antenna vector may be a different column vector selected from the virtual antenna matrix.

The same virtual antenna matrix can be used irrespective of the value K. Alternatively, a different virtual antenna matrix can be used according to the value K. For example, for the LTE UE, the BS may use the same virtual antenna matrix according to transmission of 1, 2, or 4 antennas or may use a different virtual antenna matrix.

Hereinafter, a detailed example of the virtual antenna matrix will be described.

Herein, k denotes a time-frequency resource index indicating a time-frequency resource, and $d_i$ denotes a phase (where $0 \leq d_i < 2\pi$, i=1, 2, 3, 4). For example, k may be a subcarrier index, a resource element index, or a specific resource index. A beam may be formed according to the time-frequency resource.

In addition thereto, another type of any matrix can be used as the virtual antenna matrix. For example, the virtual antenna matrix can be configured by combining a phase diagonal matrix and a constant modulus matrix. The constant modulus matrix is a matrix of which each element has same absolute value other than '0'. For example, a constant modulus matrix U may be a discrete Fourier transform (DFT) matrix or a Walsh matrix. For example, the virtual antenna matrix can be expressed by the following equation.

$$V = \begin{pmatrix} \exp(jd_0 k) & 0 & 0 & 0 & 0 & 0 & 0 & 0 \\ 0 & \exp(jd_1 k) & 0 & 0 & 0 & 0 & 0 & 0 \\ 0 & 0 & \exp(jd_2 k) & 0 & 0 & 0 & 0 & 0 \\ 0 & 0 & 0 & \exp(jd_3 k) & 0 & 0 & 0 & 0 \\ 0 & 0 & 0 & 0 & \exp(jd_4 k) & 0 & 0 & 0 \\ 0 & 0 & 0 & 0 & 0 & \exp(jd_5 k) & 0 & 0 \\ 0 & 0 & 0 & 0 & 0 & 0 & \exp(jd_6 k) & 0 \\ 0 & 0 & 0 & 0 & 0 & 0 & 0 & \exp(jd_7 k) \end{pmatrix} U \qquad \text{[Equation 10]}$$

Herein, a matrix U is a constant modulus matrix, k denotes a time-frequency resource index indicating a time-frequency resource, and $d_i$ denotes a phase (where $0 \leq d_i < 2\pi$, i=1, 2, 3, 4). The constant modulus matrix U may be a unitary matrix of which each element has the same absolute value. k may be a subcarrier index, a resource element index, or a specific resource index.

If the phase $d_i$ is '0' (where i=0, 1, ..., 7), the virtual antenna matrix V becomes U. The phase $d_i$ may be a fixed value, or may be determined by the BS (where i=0, 1, ..., 7).

The virtual antenna matrix can be configured by extending the DFT matrix or the Walsh matrix. For example, the virtual antenna matrix can be expressed by the following equation.

$$V = (v_0\ v_1\ ...\ v_7) = \begin{pmatrix} D_{4 \times 4} & 0 \\ 0 & D_{4 \times 4} \end{pmatrix} \text{ or } \begin{pmatrix} W_{4 \times 4} & 0 \\ 0 & W_{4 \times 4} \end{pmatrix} \qquad \text{[Equation 11]}$$

Herein, $D_{4 \times 4}$ denotes a 4×4 DFT matrix, and $W_{4 \times 4}$ denotes a 4×4 Walsh matrix. As such, the virtual antenna matrix can be configured by extending the DFT matrix or the Walsh matrix in a block diagonal shape.

$$V = \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ \exp(jd_1 k) & 0 & 0 & 0 & -\exp(jd_1 k) & 0 & 0 & 0 \\ 0 & \exp(jd_2 k) & 0 & 0 & 0 & -\exp(jd_2 k) & 0 & 0 \\ 0 & 0 & \exp(jd_3 k) & 0 & 0 & 0 & -\exp(jd_3 k) & 0 \\ 0 & 0 & 0 & \exp(jd_4 k) & 0 & 0 & 0 & -\exp(jd_4 k) \end{pmatrix} \qquad \text{[Equation 9]}$$

As described above, the virtual antenna matrix can be configured differently according to the number of Tx antennas supporting the LTE UE. In addition, one or more virtual antenna matrices for a specific number (e.g., 1, 2, or 4) of Tx antennas can be configured. In this case, a different virtual antenna matrix can be used according to a situation such as a transmission scheme, a subframe, a radio frame, a relay node, etc.

The aforementioned virtual antenna matrix may be transparent from the perspective of the UE. From the perspective of the UE, it can be viewed as CSI-RS transmission through only a different Tx antenna group due to the virtual antenna matrix. For example, a Tx antenna group may include a CSI-RS antenna group 1 which is represented by 4 Tx antennas and a CSI-RS antenna group 2 which is represented by 8 Tx antennas. In this case, a specific virtual antenna or precoder by which each CSI-RS antenna group is configured is not necessarily known to the UE. However, a CSI-RS antenna group used for measurement of multi-antenna channels is configured differently depending on the UE. A plurality of CSI-RS antenna groups can be configured to have the same number of Tx antennas.

As described above, a CSI-RS generated with a plurality of types can be transmitted with a specific period. Such a period is called a duty cycle. For example, the duty cycle may be any one of 5 ms, 10 ms, 20 ms, and 40 ms. That is, the CSI-RS can be transmitted with a duty cycle corresponding to a plurality of subframes. A DRS for data demodulation is transmitted in every subframe, but a CSI-RS which is a reference signal for channel measurement can be transmitted with a period corresponding to a plurality of subframes according to a report period of channel measurement information. Such a method can be a good compromise between an overhead caused by the reference signal and performance improvement caused by the reference signal. In particular, if the number of layers to be transmitted is small, the overhead caused by the reference signal can be reduced since the overhead caused by the DRS is reduced.

Figure 15:
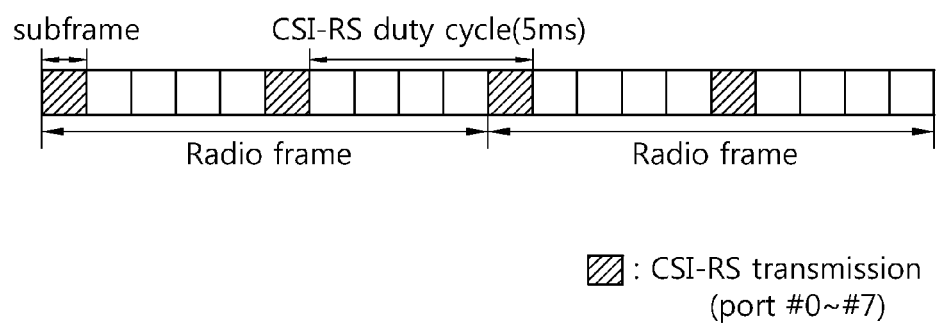
FIG. 15 shows a method of transmitting a CSI-RS according to an embodiment of the present invention.

FIG. 15 shows a method of transmitting a CSI-RS according to an embodiment of the present invention.

As shown in FIG. 15, if a duty cycle is 5 ms, the CSI-RS can be transmitted with a period of 5 subframes. The CSI-RS can be transmitted by performing code division multiplexing (CDM) so that channel measurement can be performed for 8 Tx antennas.

The CSI-RS can be transmitted in a plurality of subframes within a duty cycle according to a Tx antenna or a Tx antenna group.

Figure 16:
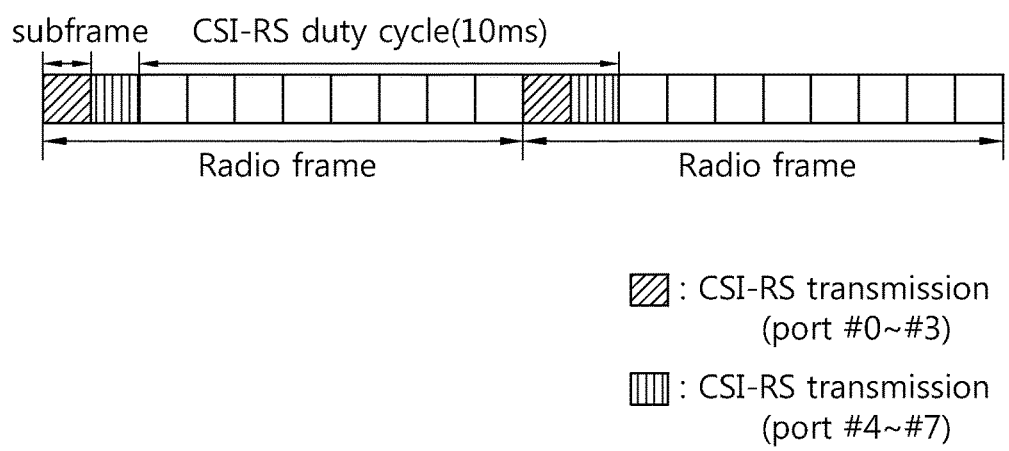
FIG. 16 shows an example of a CSI-RS transmitted in a plurality of subframes within a duty cycle.

FIG. 16 shows an example of a CSI-RS transmitted in a plurality of subframes within a duty cycle.

Assume that Tx antennas #0 to #3 are referred to as an antenna group 1, and Tx antennas #4 to #7 are referred to as an antenna group 2. Then, a CSI-RS for the Tx antenna group 1 and a CSI-RS for the Tx antenna group 2 can be transmitted in different subframes within a duty cycle of 10 ms. That is, by transmitting the CSI-RSs for the Tx antennas #0 to #7 in the plurality of subframes within one duty cycle, it is possible to prevent the CSI-RSs from being allocated with excessively high density in a specific subframe. Transmitting of the CSI-RSs in the plurality of subframes within the duty cycle as described above is referred to as multi-subframe extension.

A resource block for transmitting a CSI-RS for the Tx antenna group 1 may be different from a resource block for transmitting a CSI-RS for the Tx antenna group 2. For example, the CSI-RS for the Tx antenna group 1 may be transmitted in an $i^{th}$ resource block, and the CSI-RS for the Tx antenna group 2 may be transmitted in an $(i+1)^{th}$ resource block.

Figure 17:
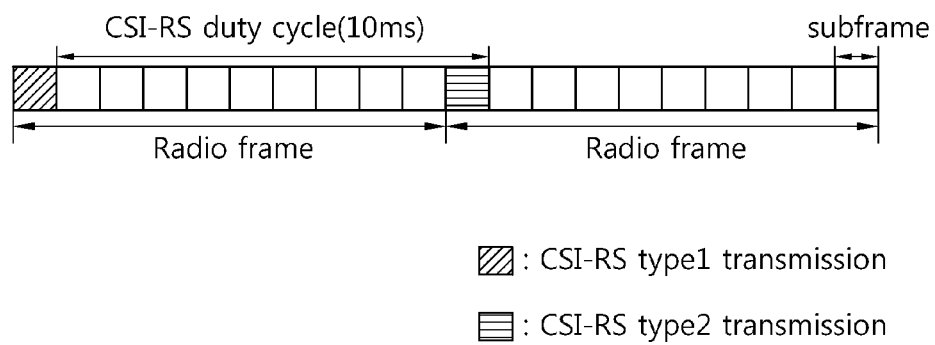
FIG. 17 shows an example in which different types of CSI-RSs are transmitted with a specific duty cycle.

FIG. 17 shows an example in which different types of CSI-RSs are transmitted with a specific duty cycle.

The different types of CSI-RSs may have the same CSI-RS pattern, or may have different CSI-RS patterns. The CSI-RS pattern implies a pattern of a reference resource element in which a CSI-RS is deployed within a basic unit. In case of having the same CSI-RS pattern, resource elements are identical in time/frequency domains. In this case, codes that can be identified in a code domain can be used to identify the different types of CSI-RSs.

In case of having the different CSI-RS patterns, the different types of CSI-RSs can be identified since resource elements are identified on the time/frequency domains. The different CSI-RS patterns may have a format in which one CSI-RS pattern is shifted along a time axis or a frequency axis.

For convenience of explanation, the different types of CRI-RSs are called a CSI-RS type 1 and a CSI-RS type 2. Then, for example, the CSI-RS type 1 may be the aforementioned precoded CSI-RS and the CSI-RS type 2 may be the aforementioned non-precoded CSI-RS.

The CSI-RS type 1 and the CSI-RS type 2 can be alternately transmitted at a transmission time depending on a duty cycle of 10 ms. That is, the types of CSI-RSs to be transmitted may change at each duty cycle. The UE can perform channel estimation by receiving any one of CSI-RSs of the type 1 and the type 2. In this case, the UE can know about a downlink transmission mode in advance by receiving a higher layer signal such as an RRC signal from the BS, and can know which type of CSI-RS is transmitted.

Upon receiving a specific suitable CSI-RS type according to the downlink transmission mode, each UE can feed back different channel measurement information. For example, upon receiving a precoded CSI-RS, the UE can feed back a CQI (e.g., an MCS level suitable for a channel) and an RI as channel measurement information, and upon receiving a non-precoded CSI-RS, the UE can feed back a CQI (e.g., quantization information of a channel or quantization information of an effective channel), an RI, and a PMI as channel measurement information. The PMI indicates a codebook index suitable for the channel, and the RI indicates a rank of the channel.

The different types of CSI-RSs can have different duty cycles. For example, if there are two types of CSI-RSs, each CSI-RS has a different duty cycle, and thus one CSI-RS can be transmitted more frequently than another CSI-RS.

Figure 18:
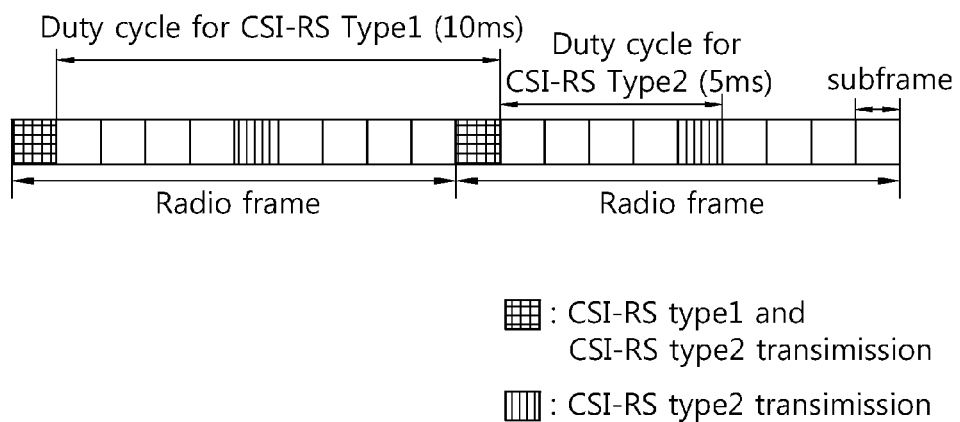
FIG. 18 shows an example in which different types of CSI-RSs have different duty cycles.

FIG. 18 shows an example in which different types of CSI-RSs have different duty cycles.

In FIG. 18, a CSI-RS type 1 is transmitted with a duty cycle of 10 ms, and a CSI-RS type 2 is transmitted with a duty cycle of 5 ms. Whether different types of CSI-RSs can be transmitted in the same subframe can vary depending on a CSI-RS pattern. For example, if the CSI-RS type 1 and the CSI-RS type 2 have the same CSI-RS pattern, only one of the two can be transmitted. On the other hand, if the CSI-RS type 1 and the CSI-RS type 2 have different CSI-RS patterns, they can be transmitted in the same subframe. Alternatively, even if the different types of CSI-RSs have the same CSI-RS pattern, they can be transmitted in the same subframe by performing CDM.

Figure 19:
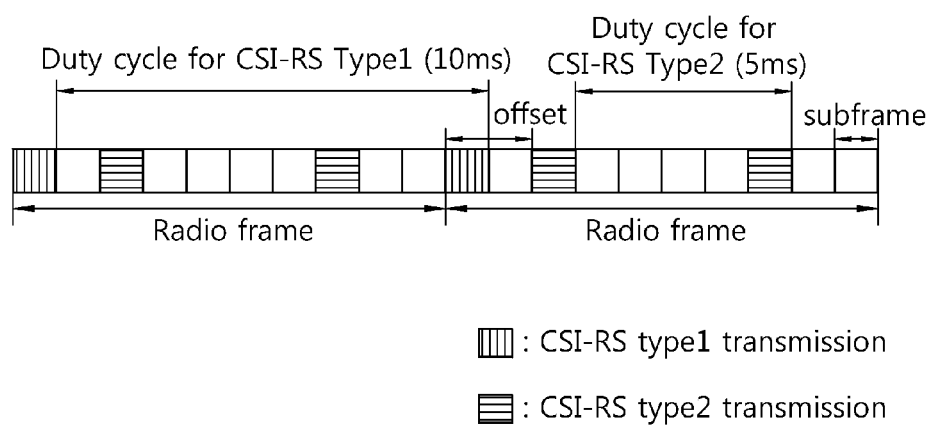
FIG. 19 shows an example in which different types of CSI-RSs are transmitted with an offset value.

FIG. 19 shows an example in which different types of CSI-RSs are transmitted with an offset value.

It is assumed that a CSI-RS type 1 has a duty cycle of 10 ms, and a CSI-RS type 2 has a duty cycle of 5 ms. The CSI-RS type 2 can have two subframes as an offset value with respect to the CSI-RS type 1. Then, the CSI-RS type 2 can be transmitted always in another subframe instead of being transmitted in the same subframe as the CSI-RS type 1. If different types of CSI-RSs have the same CSI-RS pattern, they can be prevented from being transmitted in the same subframe by the use of the offset value.

Although the subframe is exemplified as a unit of an offset value in the above example, the present invention is not limited thereto, and thus a slot unit is also possible. The offset value can be determined by a BS.

Figure 20:
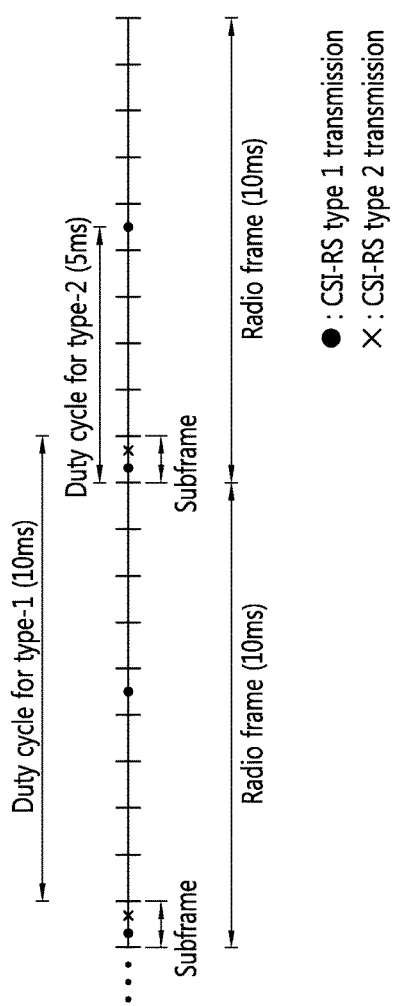
FIG. 20 shows an example in which different types of CSI-RSs are transmitted with separate duty cycles of offsets.

FIG. 20 shows an example in which different types of CSI-RSs are transmitted with separate duty cycles or offsets.

Separate duty cycles or separate duty offsets can be used for different types of CSI-RSs. In detail, a duty cycle for a CSI-RS type 1 and a duty cycle for a CSI-RS type 2 can be separately configured. Further, duty cycle offsets can be separately configured for the CSI-RS type 1 and CSI-RS type 2.

An example of FIG. 20 discloses separately-configured duty cycles, which allow a specific CSI-RS type to be transmitted more frequency than the other CSI-RS type.

Although it has been described in the above examples that different types of CSI-RSs are transmitted periodically, the present invention is not limited thereto. For example, the CSI-RS type 2 can be transmitted non-periodically whereas the CSI-RS type 1 is transmitted periodically. The BS can report a subframe, in which a non-periodic CSI-RS is transmitted, to the UE by using a higher layer signal such as an RRC signal, or can report that the non-periodic CSI-RS is transmitted in a first subframe of a radio frame.

The BS can report a subband size for at least one of a plurality of different types of CSI-RSs. The subband implies consecutive resource block groups.

For example, if the CSI-RS is a precoded CSI-RS, the CSI-RS is transmitted by performing precoding via a precoder. The precoding can be performed by using one precoding matrix across a full frequency band, which is referred to as wideband precoding. In this case, one precoding matrix is used for one UE. However, a channel may be a frequency selective channel or a frequency flat channel. In case of the frequency selective channel, a property of a MIMO channel may vary depending on a frequency band. As long as a spatial channel correlation is relatively low, a different precoding matrix can be used according to a frequency band in order to acquire a higher performance gain.

When precoding is performed by using a different precoding matrix according to a frequency band, it is called frequency selective precoding. In this case, a multiple precoding matrix can be used for one UE.

When the precoded CSI-RS is used in channel estimation, channel estimation performance is significantly influenced by whether a receiver knows a specific precoding matrix applied to a specific frequency band (i.e., a subband) among multiple precoding matrices. If the receiver can know a frequency region in which the specific precoding matrix is used, the receiver can perform channel estimation through channel interpolation in that frequency region. If channel estimation is performed through channel interpolation, noise and interference can be suppressed, thereby being able to increase channel estimation performance. If the receiver is a part of the UE, the UE can know information on the subband by using a resource allocation field included in a downlink grant.

Figure 21:
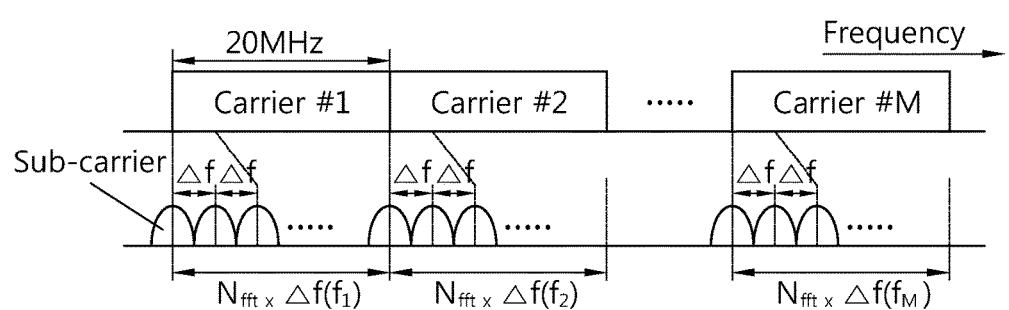
FIG. 21 shows an example in which multiple carriers appear in a frequency band in a multiple carrier system.

FIG. 21 shows an example in which multiple carriers appear in a frequency band in a multiple carrier system.

M carriers can exist in the multiple antenna system (where M is a natural number greater than or equal to 2). Each carrier is referred to as a component carrier. A component carrier may be 20 MHz for example. The multiple carrier system supports carrier aggregation. The carrier aggregation means that a wideband can be configured by aggregating a plurality of narrowband component carriers. The carrier aggregation can support an increasing throughput through extension of a transmission bandwidth, prevent cost rising caused by introduction of a wideband radio frequency (RF) device, and ensure compatibility with a legacy system. For example, through extension of the transmission bandwidth, up to a 100 MHz bandwidth can be supported by aggregating 5 carriers by using a component carrier having a 20 MHz bandwidth as a granularity.

In the multiple carrier system, a different type of CSI-RS can be used for each component carrier or component carrier group. When one UE receives a signal through a plurality of component carriers, the different type of CSI-RS can be received and used for each component carrier.

Figure 22:
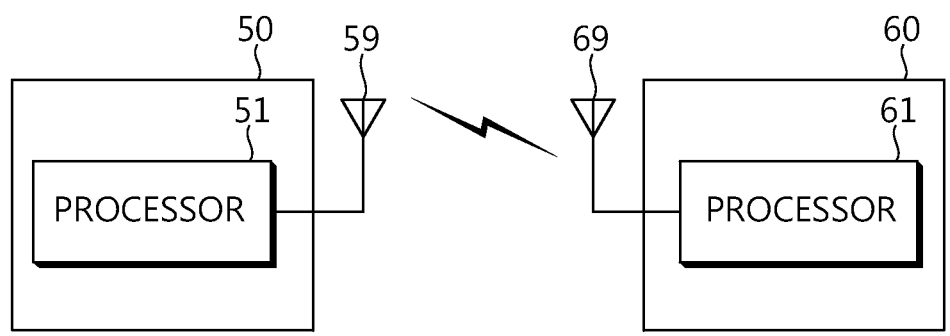
FIG. 22 is a block diagram showing an apparatus of wireless communication for implementing an embodiment of the present invention.

FIG. 22 is a block diagram showing an apparatus of wireless communication for implementing an embodiment of the present invention.

A BS 50 includes a processor 51 and an antenna 59. The processor 51 is coupled to the antenna 59, and implements the proposed functions, processes, and/or methods. Layers of a protocol stack may be implemented by the processor 51. The antenna 59 transmits or receives a signal. One or a plurality of antennas 59 may be provided. The BS 50 may further include a memory (not shown). The memory (not shown) is coupled to the processor 51, and stores a variety of information for driving the processor 51.

A UE 60 includes a processor 61 and an antenna 69. The processor 61 is coupled to the antenna 69, and implements the proposed functions, processes, and/or methods. Layers of a radio interface protocol may be implemented by the processor 61. The antenna 69 transmits a Tx signal or receives an Rx signal. One or a plurality of antennas 69 may be provided. The UE 60 may further include a memory (not shown). The memory (not shown) is coupled to the processor 61, and stores a variety of information for driving the processor 61.

The processors 51 and 61 may include an application-specific integrated circuit (ASIC), a separate chipset, a logic circuit, a data processing unit, and/or a radio frequency (RF) unit for mutually converting a baseband signal and a radio signal. The proposed transmitter may be implemented in the processors 51 and 61. The memory (not shown) may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory (not shown) and may be performed by the processors 51 and 61. The memory (not shown) may be located inside or outside the processors 51 and 61, and may be coupled to the processors 51 and 61 by using various well-known means.

As described above, in a wireless communication system, a BS can provide different types of CSI-RSs and a UE can selectively receive a specific type of a CSI-RS according to the number of Tx antennas, a transmission mode, a feedback mode, etc. Therefore, in a case where UEs each of which supports a different number of antennas and which use various transmission schemes coexist in the system, a ref-

What is claimed is:

1. A method of transmitting reference signals by a base station via a downlink channel including a physical downlink control channel (PDCCH) and a physical downlink shared channel (PDSCH) in a wireless communication system, the method comprising:

determining first radio resources for first type channel state information reference signals (CSI-RSs) to be transmitted via a first sub-band and second radio resources for second type CSI-RSs, to be transmitted via a second sub-band, wherein each sub-band includes consecutive resource blocks (RBs), wherein the first type and second type CSI-RSs are used for channel measurement, wherein the first radio resources are determined by a first duty cycle and a first offset and the second radio resources are determined by a second duty cycle and a second offset;

transmitting control signal associated with the first and second radio resources, wherein the control signal includes first information on whether the first type CSI-RSs are periodic or aperiodic, wherein the control signal includes second information on whether the second type CSI-RSs are periodic or aperiodic, wherein the control signal includes third information on a time point to transmit the first type CSI-RSs when the first type CSI-RSs are aperiodic, wherein the control signal includes fourth information on a time point to transmit the second type CSI-RSs when the second type CSI-RSs are aperiodic; and transmitting at least one of the first type CSI-RSs based on the first radio resources or the second type CSI-RSs based on the second radio resources.

2. The method of claim 1, wherein the first type CSI-RSs are associated with a first number of transmit antennas and the second type CSI-RS are associated with a second number of transmit antennas.

3. The method of claim 1, wherein information indicating the first duty cycle and the second duty cycle is transmitted via radio resource control (RRC) signaling.

4. The method of claim 1, wherein, the second type CSI-RSs are transmitted by being shifted by an offset value from a point at which the first CSI-RSs are transmitted.

5. The method of claim 1, further comprising transmitting a reference signal for demodulation, wherein the reference signal for demodulation is transmitted in every subframe.

6. The method of claim 1, wherein each of the at least one duty cycle is corresponding to one or more subframe.

7. The method of claim 1, wherein a first reference signal pattern is applied to the first type CSI-RSs and a second reference signal pattern is applied to the second type CSI-RSs.

8. The method of claim 7, wherein the second reference signal pattern of the second type CSI-RSs has a format in which the first reference signal pattern of the first type CSI-RSs is shifted along a time axis or a frequency axis.

9. The method of claim 1, wherein if the base station transmits the reference signal for channel measurement by using multiple carriers, types of the plurality of reference signals for channel measurement are determined for the respective carriers.

10. An apparatus for transmitting reference signals via a downlink channel including a physical downlink control channel (PDCCH) and a physical downlink shared channel (PDSCH), the apparatus comprising:

a transceiver transmitting the PDCCH and PDSCH; and a processor coupled to the transceiver and configured for:

determining first radio resources for first type channel state information reference signals (CSI-RSs) to be transmitted via a first sub-band and second radio resources for second type CSI-RSs to be transmitted via a second sub-band, wherein each sub-band includes consecutive resource blocks (RBs), wherein the first type and second type CSI-RSs are used for channel measurement, wherein the first radio resources are determined by a first duty cycle and a first offset and the second radio resources are determined by a second duty cycle and a second offset;

controlling the transceiver to transmit control signal associated with the first and second radio resources, wherein the control signal includes first information on whether the first type CSI-RSs are periodic or aperiodic, wherein the control signal includes second information on whether the second type CSI-RSs are periodic or aperiodic, wherein the control signal includes third information on a time point to transmit the first type CSI-RSs when the first type CSI-RSs are aperiodic, wherein the control signal includes fourth information on a time point to transmit the second type CSI-RSs when the second type CSI-RSs are aperiodic; and controlling the transceiver to transmit the first type CSI-RSs based on the first radio resources or the second type CSI-RSs based on the second radio resources.

11. The apparatus of claim 10, wherein a first reference signal pattern is applied to the first type CSI-RSs and a second reference signal pattern is applied to the second type CSI-RSs.

12. The apparatus of claim 11, wherein the second reference signal pattern of the second type CSI-RSs has a format in which the first reference signal pattern of the first type CSI-RSs is shifted along a time axis or a frequency axis.

* * * * *